(12) United States Patent
Chen et al.

(10) Patent No.: US 6,999,649 B1
(45) Date of Patent: Feb. 14, 2006

(54) OPTICAL SWITCHES MADE BY NEMATIC LIQUID CRYSTAL SWITCHABLE MIRRORS, AND APPARATUS OF MANUFACTURE

(75) Inventors: Zhan Chen, Carrollton, TX (US); Le Li, Hopewell Junction, NY (US)

(73) Assignee: Kent Optronics Inc., Fishkill, NY (US)

( * ) Notice: Subject to any disclaimer, the term of this patent is extended or adjusted under 35 U.S.C. 154(b) by 52 days.

(21) Appl. No.: 10/281,538

(22) Filed: Oct. 28, 2002

Related U.S. Application Data

(60) Provisional application No. 60/335,074, filed on Oct. 26, 2001.

(51) Int. Cl.
*G02B 6/26* (2006.01)

(52) U.S. Cl. .......................... 385/18; 385/16; 349/177; 349/188

(58) Field of Classification Search ............ 385/16–18; 349/132, 141, 168, 169, 172, 177, 186
See application file for complete search history.

(56) References Cited

U.S. PATENT DOCUMENTS

| | | | | |
|---|---|---|---|---|
| 4,893,907 A | * | 1/1990 | Mallinson | 349/171 |
| 4,994,204 A | * | 2/1991 | Doane et al. | 252/299.01 |
| 5,130,828 A | * | 7/1992 | Fergason | 349/199 |
| 5,342,545 A | * | 8/1994 | Yamada et al. | 252/299.01 |
| 5,354,498 A | * | 10/1994 | Akashi et al. | 252/299.01 |
| 5,558,813 A | * | 9/1996 | Akashi et al. | 252/299.01 |
| 5,762,823 A | * | 6/1998 | Hikmet | 252/299.01 |
| 5,951,912 A | * | 9/1999 | Mercer | 252/299.01 |
| 6,120,701 A | * | 9/2000 | Hsu | 252/299.01 |
| 6,459,533 B1 | * | 10/2002 | Clapp et al. | 359/578 |
| 6,628,355 B1 | * | 9/2003 | Takahara | 349/106 |
| 6,665,042 B1 | * | 12/2003 | Marshall et al. | 349/166 |
| 6,697,561 B1 | * | 2/2004 | He | 385/140 |
| 2002/0041726 A1 | * | 4/2002 | Thackara | 385/16 |
| 2002/0075445 A1 | * | 6/2002 | Dabrowski et al. | 349/174 |
| 2003/0197157 A1 | * | 10/2003 | Sutherland et al. | 252/582 |
| 2004/0144754 A1 | * | 7/2004 | Itami et al. | 216/62 |

* cited by examiner

*Primary Examiner*—Ellen E. Kim

(57) ABSTRACT

Technology for constructing a single layer polarization insensitive electrically switchable liquid crystal mirror is disclosed which serves as the basic element for constructing an optical router switch array in free space as well as waveguide format. The optical router switch array includes a plurality of switchable liquid crystal mirror elements having liquid crystal arranged in stack cells and/or in a waveguide configuration. The resulted optical router switches are motionless, polarization insensitive, stable within the operational spectral region, and stable versus temperature. The invention also includes methods for manufacturing a single switchable liquid crystal mirror element and the optical switch arrays. The same technology is further extended to constructing an electrically tunable optical filter that is motionless and polarization insensitive.

12 Claims, 26 Drawing Sheets

(a)

(b)

(a)

(b)

OPTICAL SWITCHES MADE BY NEMATIC LIQUID CRYSTAL SWITCHABLE MIRRORS, AND APPARATUS OF MANUFACTURE

This application claims priority from U.S. provisional application 60/335,074 filed on Oct. 26, 2001.

BACKGROUND OF THE INVENTION

1. Field of the Invention

The present invention relates to optical matrix switches made by single layer liquid crystal switchable elements and the fabrication methods.

2. Description of the Related Art

High performance optical matrix switches are critical components for telecom. Quality switchable mirrors are important in constructing the high performance optical matrix switches. In the following, related prior art technologies are cited as the reference for the present invention. The first prior art technology is based on liquid crystal phase shifter/rotator as disclosed by, Corning, Exhibition in NFOEC'2000, Denver, Colo., Aug. 27–31, 2000 and SpectraSwitch, Exhibition in NFOEC'2000, Denver, Colo., Aug. 27–Aug. 31, 2000 and Chorum, Exhibition in NFOEC'2000, Denver, Colo., Aug. 27–Aug. 31, 2000. This technology switches light without involving moving parts and is relatively fast. FIG. 1 shows the schematic diagram of the switch which is copied from the SpectraSwitch website.

In order to accomplish one switching action of an unpolarized beam of light, numerous optical components have to be used. The light has to pass a passive polarizing beam splitter to be split into two beams with orthogonal polarization states. Each split beam has to pass an active liquid crystal phase retarder/rotator so that their polarization is modulated. Next, each beam has to be reflected by a mirror. Finally, the two beams pass another polarizing beam splitter where they are combined to become an unpolarized beam again. Modulation of the liquid crystal phase retarder/rotator determines the output direction of the final beam from the second beam splitter. Due to the fact that six optical elements (two beam splitters, two LC modulators and two mirrors) are involved in accomplishing one switching action, this is no longer a single layer switchable mirror. Furthermore, the optical modulation by the liquid crystal phase shifter or rotator is intrinsically not broadband, which imposes significant optical cross talk at the wavelengths outside the liquid crystal device bandwidth. Finally, this technology intrinsically is polarization dependent and has significant polarization dispersion loss (PDL).

The second prior art technology for a motionless electrically switchable mirror is holographically-formed polymer dispersed liquid crystal, or H-PDLC. H-PDLC's as disclosed by V. Natarajan, R. L. Sutherland, V. P. Tondiglia, T. J. Bunning, and W. W. Adams, Jounal of Non-Linear Optical Physics and Materials, 89 (1996) and G. P. Crawford, T. G. Fiske, and L. D. Silverstein, Journal of the SID, 45 (1997) are a variant of polymer dispersed liquid crystals (PDLCs) formed under holographic conditions. Although H-PDLC features single layer, motionless, and polarization insensitive, it has a limited spectral bandwidth (only around 20 nm) and limited reflection efficiency. FIG. 2 illustrates the H-PDLC structure, wherein the LC structure 205, 210 are the two states of operation. The holography introduces a periodic array of liquid crystal droplets (with diameters of 20 nm–200 nm) and solid polymer planes with an interference fringe spacing d. As shown by the LC structure 205, when no voltage applied, the LC directors 207 are mis- aligned. Since the refractive index of the LC droplets ($n_{LC}$) is different from that of the polymer planes ($n_p$), light 208 is scattered at the droplet interface. Due to the periodic modulation in the refractive index, light at the Bragg wavelength is reflected back to the observer. However, as shown in LCD structure 210, when a voltage is applied, the liquid crystals inside the droplets are aligned along the field direction, assuming that the LC has a positive dielectric anisotropy. Therefore, the liquid crystal index becomes $n_{lco}$. If $n_{lco}$ is equal to $n_p$, the periodic refractive index modulation disappears and the incident light is transmitted, realizing the switching of the device.

The third prior art technology is a modified H-PDLC technology based on cholesteric liquid crystal composite materials consisting of polymeric and non-polymeric liquid crystal compounds together with chiral additives as disclosed by M. Date and T. Hisaki, "Helical Aligned holographic polymer dispersed liquid crystal (HPKLC)", Asia Display'2000, Japan. The device was fabricated by putting liquid crystal mixture into the space between two glass plates with anti-parallel rubbed polyimide layers and irradiating it with interferential fringes of laser light. The helical pitch was much shorter than the spacing. The laser radiation formed a polymer network periodically corresponding to the interferential fringes since polymerization occurs at fringe peaks. It has been claimed that the device was transparent under zero voltage (reverse mode). When an electric field was applied, a dip in the transmission spectrum was observed that corresponds to the diffraction. It was further claimed that the device was polarization independent. However, the device shows a very low reflectivity (only around 50% or less) and its spectral bandwidth is narrow (only around 30 nm).

The forth prior art technology is disclosed in the U.S. Pat. No. 6,133,971 by Silverstein et al for constructing a holographically formed reflective display comprising a plurality of anisotropic polymers sheets, formed from at least a photo-active monomer and a photo initiator, that separate a liquid crystal material into a plurality of liquid crystal material regions. The resultant device reflects at least one selective wavelength of light with a narrow bandwidth. It is claimed that both nematic liquid crystal and/or cholesteric liquid crystal can be used to make the device.

The fifth prior art technology for constructing a switchable liquid crystal mirror is based on cholesteric liquid crystal. Conventional CLC is narrow band and polarization sensitive. FIGS. 3(a) and 3(c) show how conventional CLC's 300, when in a planar alignment which, adopt a spiral arrangement 305 to form a uniform helical structure with a pitch "P". Such a helical structure results in a light reflection at a center wavelength $\lambda_o = n_a P$ with a natural bandwidth given $\Delta \lambda_i = \Delta n \, P$ where "P" is the helix pitch. The bandwidth $\Delta \lambda$ is mainly determined by the CLC birefringence $\Delta n$. 50% of the unpolarized incident light within the band is reflected into a circular polarization state that has the same handedness as the CLC spiral, while the remaining 50% is transmitted with the opposite polarization state. The light outside the bandwidth will pass the CLC regardless of its polarization state. Depending on the CLC material, the narrow band polarizing state can be either electro-optically passive (non-switchable) if the CLC is polymerized to form a solid film (see FIG. 3 (a) and (b)). Or, it can be electro-optically active (switchable) if the CLC is made from non-polymeric low molecular weight (LMW) liquid crystal. Usually, the switchable CLC is in a planar texture under zero voltage (see FIG. 3 (a) and (b)). When it is switched by an electric field, all the CLC molecules are untwisted and aligned along the field direction so that it becomes transparent (see FIG. 3 (c)).

In order to use conventional CLC to make a switchable mirror for reflecting un-polarized light, two pieces of CLCs with opposite handedness are needed to form a double layer configuration. The reflected beam comprises two partially overlapped beams with opposite circular polarizations, one being reflected from the first CLC while the second beam from the second CLC, as shown in FIG. 4. The displacement of the two reflected beams becomes more pronounced when the incoming light is incident at a large angle, which makes this apparatus less desirable for building a switch for optical communication than the other aforementioned apparatuss.

The sixth prior art technology is based on an improved CLC material that gives rise to a broad spectral bandwidth. However, it still needs two layers of CLC's with opposite handedness for operation under an unpolarized light.

The seventh prior art technology is disclosed by, J. E. Fouquet, "Compact optical cross-connect switch based on total internal reflection in a fluid-containing planar lightwave circuit", OFC'2000, Baltimore, Md., Mar. 5–10, 2000, which is based on a fully integrated optical waveguide in which a special liquid is filled. At the bottom of each intersection of two waveguides, there is a "micro-thermal boiler". If a switch action is desired at the spot, the "boiler" heats the liquid to the boiling point so that air bubble is created. The generated air bubble behaves like a mirror that reflects light beam into the desired waveguide channel. This technology induces flow of the fluid therefore it is no longer motionless.

The eighth prior art technology is based on micro-mirror which is fabricated via micro-electrical mechanical system (MEMS) technology as disclosed by, JDS-U, Exhibition in NFOEC'2000, Denver, Colo., Aug. 27–Aug. 31, 2000 and Nortel, Exhibition in NFOEC'2000, Denver, Colo., Aug. 27–Aug. 31, 2000. Switching of light beam is realized via tilting or swinging the micro-mirror.

The final, but not the last, prior art technology is based on thermal-electric technology that switches light via thermally induced index change as disclosed by, Mitsuhiro makilara, Fusao Shimokawa, and Kazumasa Kaneko, "Strictly Non-Blocking N×N Thermo-Capillarity Optical Matrix Switch using Silica-based Waveguide", OFC'2000, Baltimore, Md., Mar. 5–10, 2000.

In summary, there does not exist a technology that promises an electrically switchable mirror that features single layer, motionless, broad spectral bandwidth, and high efficiency.

SUMMARY OF THE INVENTION

The present invention describes a new electrically switchable apparatus made by liquid crystal, switch matrix constructed by the switchable apparatus and the methods for manufacturing the switch matrix. The switching mechanism is based on the electrically induced refractive index change of a liquid crystal material, which further causes an incident light on the liquid crystal interface to be either totally reflected or transmitted regardless of the light polarization state. In one state, the liquid crystal is set in the isotropic phase in the absence of an electric field with a refractive index $n_{ISO}=[(n_e^2+2n_o^2)/3]^{1/2}$, where $n_o$ and $n_e$ are ordinary and extraordinary refractive index of the liquid crystal, respectively. $n_{ISO}$ is larger than $n_o$ but smaller than $n_e$. If $n_{ISO}$ of the liquid crystal is chosen to match that of the surrounding medium such as a glass substrate, all the polarization components of the light are transmitted since $n_{ISO}$ is optically isotropic. In another state when an electric field is applied to the liquid crystal, the liquid crystal is reoriented into a so-called electric field-forced nematic phase due to its positive and non-zero dielectric anisotropy $\Delta\epsilon$. The longer axis of the liquid crystal molecules is required to be aligned as close as possible to the propagation direction of the incident light. Under this situation, the "P" polarized light sees an ordinary index $n_o$ while "S" polarized light sees an effective refractive index $n_{eff}$ of the liquid crystal. If the light is incident onto the liquid crystal surface at a large oblique angle, this $n_{eff}$ becomes slightly larger than $n_o$ but still smaller than $n_{ISO}$. Therefore, if the incident angle is greater than the critical angle for total internal reflection for both polarizations, an unpolarized beam is totally internally reflected at the interface between the liquid crystal and substrate. Thus the liquid crystal mirror is electrically switched between transparent state and reflection state.

Obviously, the most preferred liquid crystal is a nematic liquid crystal although other liquid crystals such as cholesteric liquid crystal (also called chiral nematic) and smectic liquid crystal are useable.

As another aspect of the present invention, novel "N×N" optical matrix switches are constructed by using the switchable liquid crystal mirrors of the present invention.

As a more important aspect of the present invention, a fully integrated waveguide optical matrix switch is created by integrating the switchable elements into a planar light waveguide circuit (PLC).

Therefore, it is the main object of the present invention to create a single layer electrically switchable element from liquid crystal material.

Another object of the present invention relates to creating switching apparatuses based on the single layer switchable mirror element.

Yet another object of the present invention includes a matrix switch comprising a plurality of the single layer liquid crystal switchable mirrors of the present invention.

Yet another object of the present invention is a waveguide matrix switch comprising a plurality of single layer liquid crystal switchable mirrors integrated into an optical waveguide.

Yet another object of the present invention is related to the fabrication procedure of the switchable liquid crystal mirrors and the switch array.

Yet another object of the present invention is an electrically tunable spectrum filter made from the principle associated with the liquid crystal switchable mirror element.

The accompanying description and drawings are directed to the switchable mirror as well as optical matrix switch devices and a polarization insensitive tunable spectrum filter, the method to create a single layer polarization independent switchable liquid crystal mirror, and the method for creating a switch array prepared thereby.

DETAILED DESCRIPTION OF THE PREFERRED EMBODIMENT

It is therefore appreciated and understood by persons of ordinary skill in the art that the following description is for purposes of illustration and not for limitation. So as not to obscure the description of the invention, procedures and processes known to persons of ordinary skill in the art are referred with sufficient clarity for the artisan to practice the claimed invention.

The first embodiment describes the single layer switchable element made by a liquid crystal. The exemplary liquid crystal is a nematic liquid crystal with either positive dielectric anisotropy (Δε>0) or negative dielectric anisotropy (Δε<0) although other liquid crystals are applicable.

Figure 1:
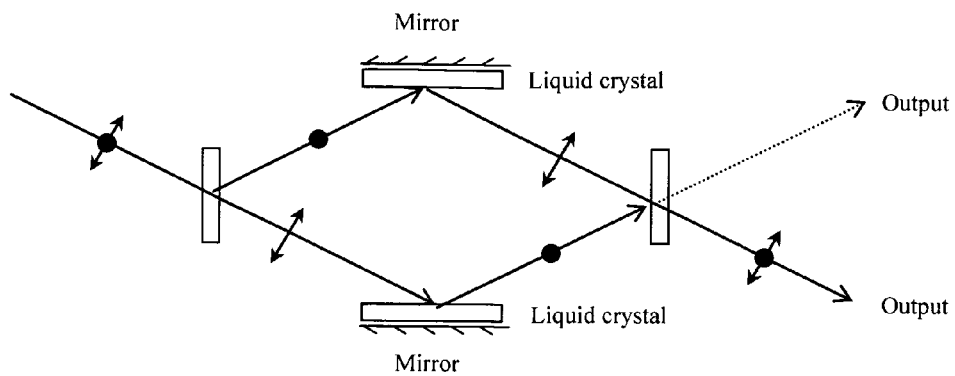
FIG. 1 is a schematic illustration of a prior art optical switch using a liquid crystal plate.
Figure 2:
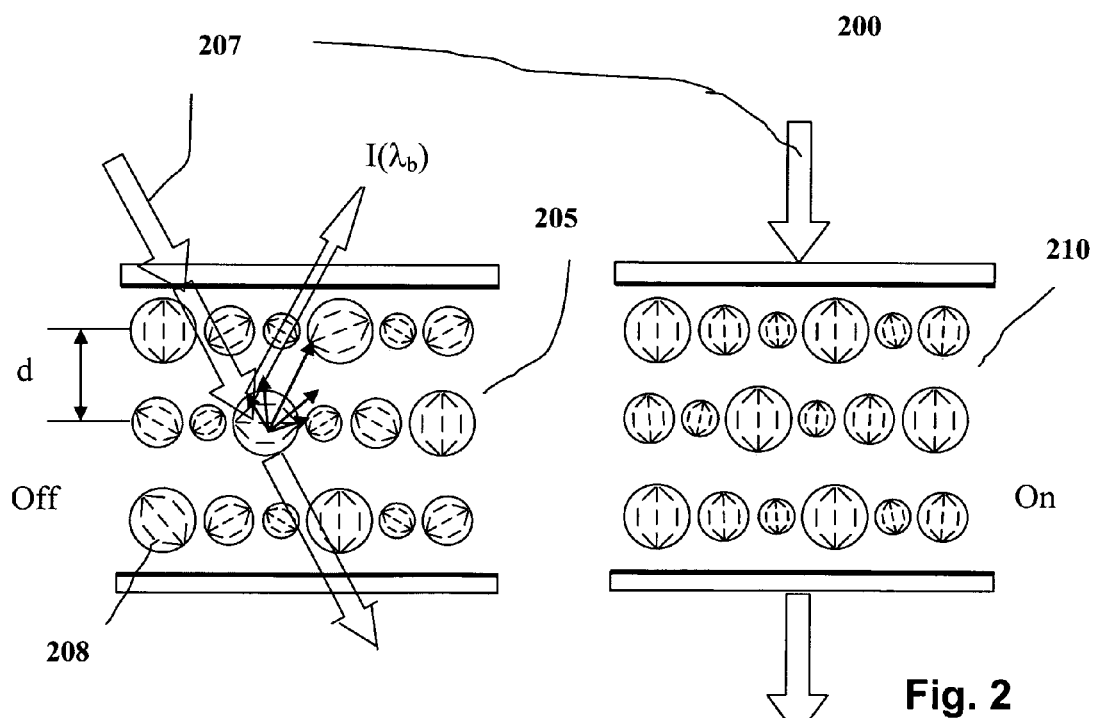
FIG. 2 is a schematic illustration of a prior art switchable mirror structure made by holographic polymer dispersed liquid crystal.
Figure 3:
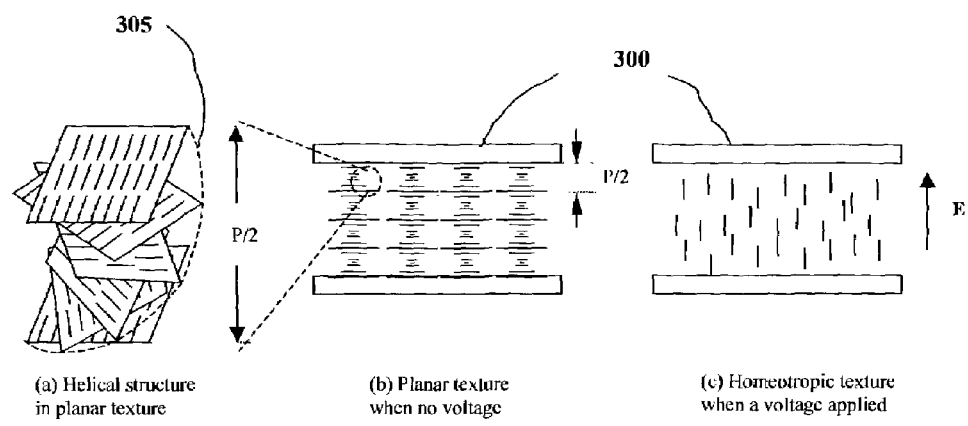
FIG. 3 illustrates basic alignment texture of a CLC Film.
Figure 4:
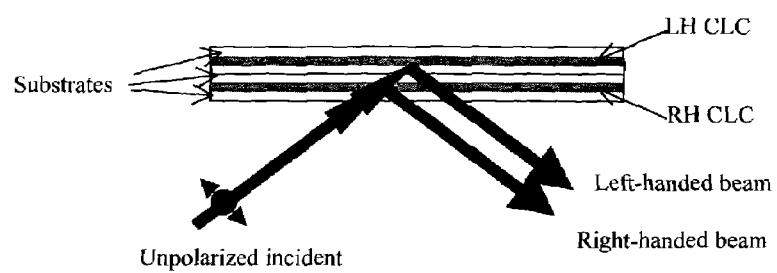
FIG. 4 is a schematic illustration of the light reflection from the switchable mirrors made from cholesteric liquid crystal, where the reflected beams are spatially displaced.
Figure 5:
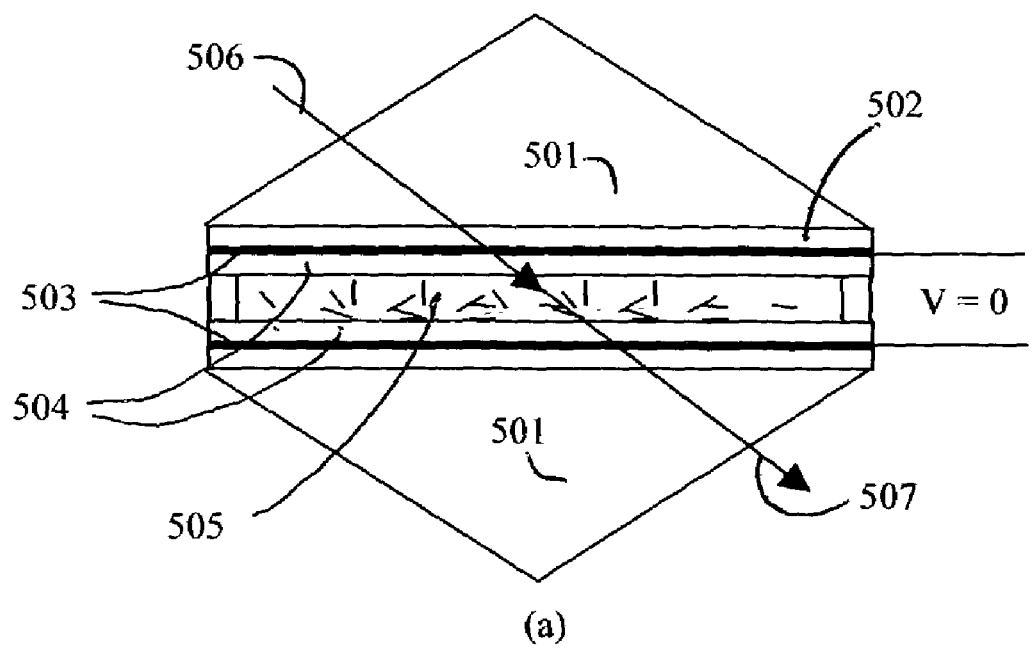
FIG. 5 is a schematic illustration of a free space liquid crystal switchable element according to the current invention in which the nematic liquid crystal has a positive dielectric anisotropy Δε>0 and the solid electrodes are in the optical path.
Figure 5:
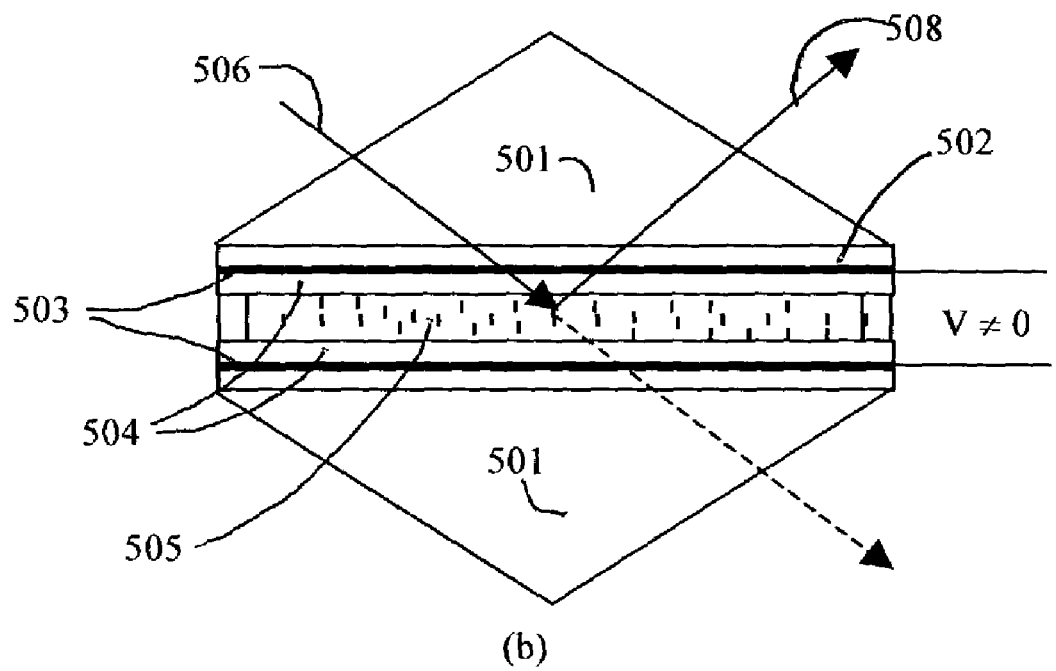

A. Free Space Switchable Elements a. Switchable Element with Conventional Electrodes—I FIG. 5 shows the first switchable element structure, in which the liquid crystal (505) is sandwiched between two substrates (502) with Indium Tin Oxide (ITO) electrode (503). The liquid crystal is a nematic liquid crystal with a positive dielectric anisotropy (Δε≧0). The ITO electrodes (503) are within the optical path of the incident beam (506), transmitted beam (507) and reflected beam (508). Between the ITO and the liquid crystal, there is an index matching layer (504). Two optical coupling elements such as prisms (501) are attached to the apparatus. It is preferred that the coupling elements have an index of refraction equal to that of the substrates.

Under zero voltage, the liquid crystal (505) is set in the isotropic phase with an isotropic refractive index $n^{iso}=[(2n_o^2+n_e^2)/3]^{1/2}$ that is chosen to equal to that of the glass substrate, i.e., $n_{iso}=n_G$. As a result, both "S" and "P" polarizations of an incident beam of light are transmitted by the liquid crystal mirror due to the index matching condition, where the "S" polarization is defined as the direction of the electric field of the light that is perpendicular to the incident plane (i.e., the paper plane); while the "P" polarization is within the incident plane (FIG. 5(a)).

In the presence of a sufficient voltage that is applied to the liquid crystal through the two ITO electrodes, the liquid crystal (505) is aligned along the electric field into a homeotropic texture since the nematic has a positive dielectric anisotropy. Here, the liquid crystal is not necessarily a nematic liquid crystal. For example, liquid crystal in cholesteric phase or even in smectic phase is adequate. Assuming a cholesteric liquid crystal, it can be aligned into a nematic phase by a sufficient field regardless of the fact that it has chiral center.

Due to the field-induced phase transition, the refractive index of the liquid crystal is changed. Assume the liquid crystal has $n_o=1.5$, and $n_e=1.65$. Its isotropic index $n_{iso}=n_G=[(2n_o^2+n_e^2)/3]^{1/2}=1.55$. When the nematic is electrically aligned along the electric field, the "S" polarization "sees" the ordinary index $n_o=1.5$ of the liquid crystal. At an incident angle greater than the critical angle for total internal reflection that is calculated to be $=\sin^{-1}(n_o/n_G)=\sin^{-1}(1.5/1.55)=75°$, the "S" polarization is reflected via total internal reflection at the top interface between the nematic an substrate. However, the "P" polarization "sees" an effective index $n_{eff}=n_e n_o/(n_o^2 \cdot \sin^2\theta+n_e^2 \cdot \cos^2\theta)^{1/2}$, where θ is the incident angle. Assume the incident angle is slightly greater than the critical angle, i.e., θ=76°, the effective index of refraction is calculated to be 1.64 which is larger than $n_G$. Thus the P-polarization is not totally internally reflected.

In order to reflect this "P" polarization, one of the methods is to use the Fabry-Perot (F-P) mechanism. A Fabry-Perot resonator consists of two reflectors with a certain gap in which a dielectric medium may or may not be filled. The interfaces between the substrate (502) and liquid crystal (505) serves as the reflectors. It is known that a Fabry-Perot resonator transmits a series of narrow bandwidth light whose wavelength depends on the spacing between the two reflectors and the index of the medium filling the spacing, as described in the literature "Principles of Optics" by Max Born and Emil Wolf, sixth edition, Pergamon Press, 1980. Between each pair of transmission peaks, light is reflected. However, the reflectivity for the "P" polarization is determined by the reflectivity at the liquid crystal and substrate interface, which is not sufficiently high. Therefore, only part of the "P" polarized light is reflected in the presence of an electric field (FIG. 5 (b)).

Therefore, the following more preferred techniques are a more efficiency free space switchable element.

b. Switchable Mirror Element with Conventional Electrodes—II

Figure 6:
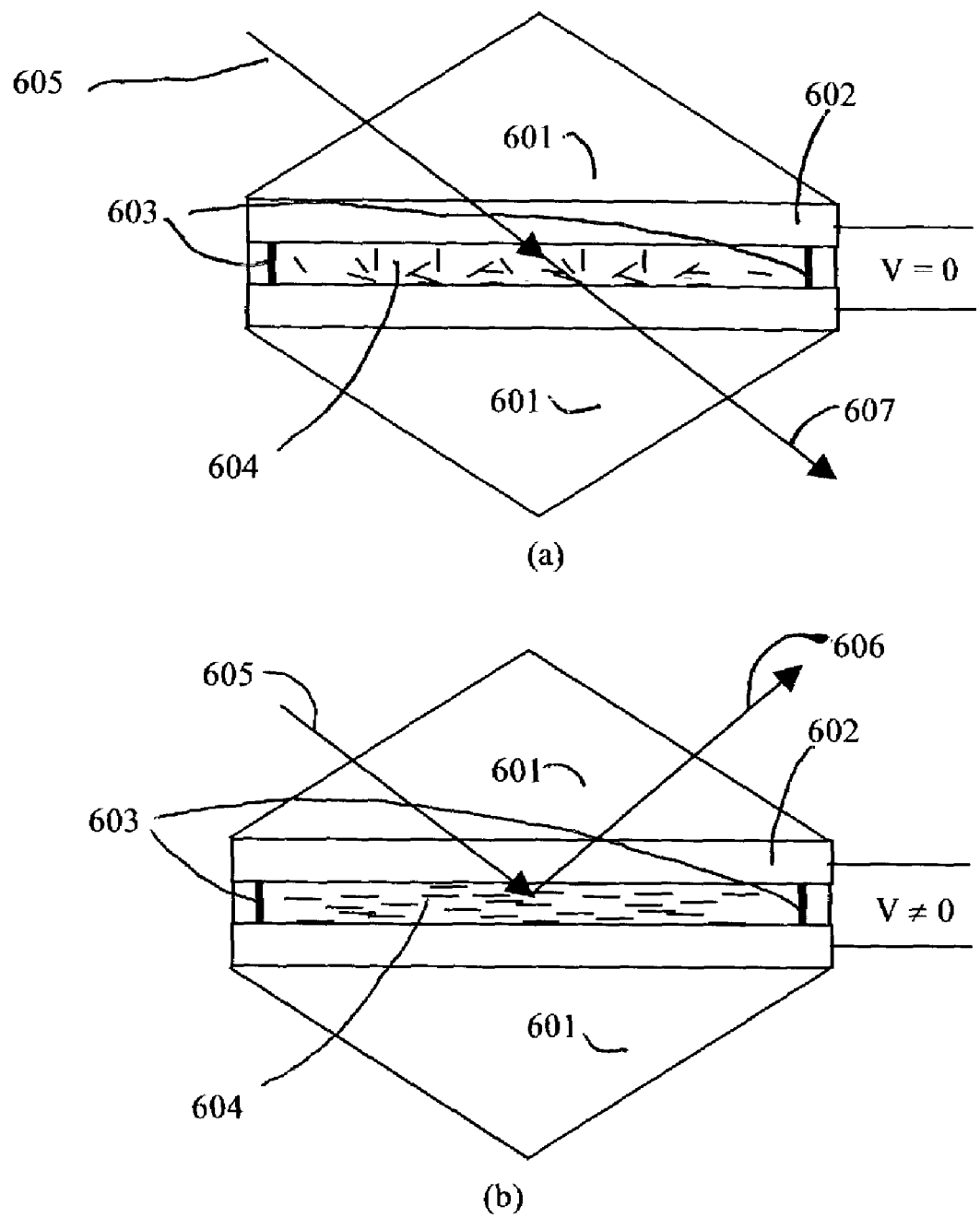
FIG. 6 illustrates another preferred free space switchable element according to the current invention in which the nematic liquid crystal has a positive dielectric anisotropy Δε>0 and the solid electrodes are out of the optical path.

FIG. 6 shows the second switchable element where the liquid crystal (604) has a positive dielectric anisotropy ($\Delta\epsilon \geq 0$), as an example. In this design, the ITO electrodes (603) are arranged at the two edges of the switchable element and thus are outside the optical path of the light beams. The liquid crystal (604) is sandwiched between the two bare substrates (602). Two glass coupling prisms (601) with an index $n_G$ are attached to the apparatus.

In the absence of an electric field, the liquid crystal (604) is in isotropic phase and the switchable element is transparent to an un-polarized incident light due to the index matching condition (FIG. 6(a)).

In the presence of a sufficient voltage, the nematic is aligned along the electric field into a homogeneous texture with its director parallel to the substrate surface. The "S" polarized light "sees" $n_o=1.5$ and is reflected via the total internal reflection apparatus. The "P" polarization "sees" an effective index $n_{eff}=n_e n_o/(n_o^2 \cdot \sin^2\theta + n_e^2 \cdot \cos^2\theta)^{1/2}$, where $\theta$ is the angle between the incident beam and the substrate. Under the same incident angle, this effective index is calculated to be 1.508 using $n_e=1.65$. This $n_{ISO}$ is very close to $n_o$. Choosing the incident angle slightly larger than the critical angle for total internal reflection, both S- and P-polarizations are totally internally reflected when the element is electrically switched on (FIG. 6(b)).

c. Switchable Element with In-Plane Switching Electrodes—I

Figure 7:
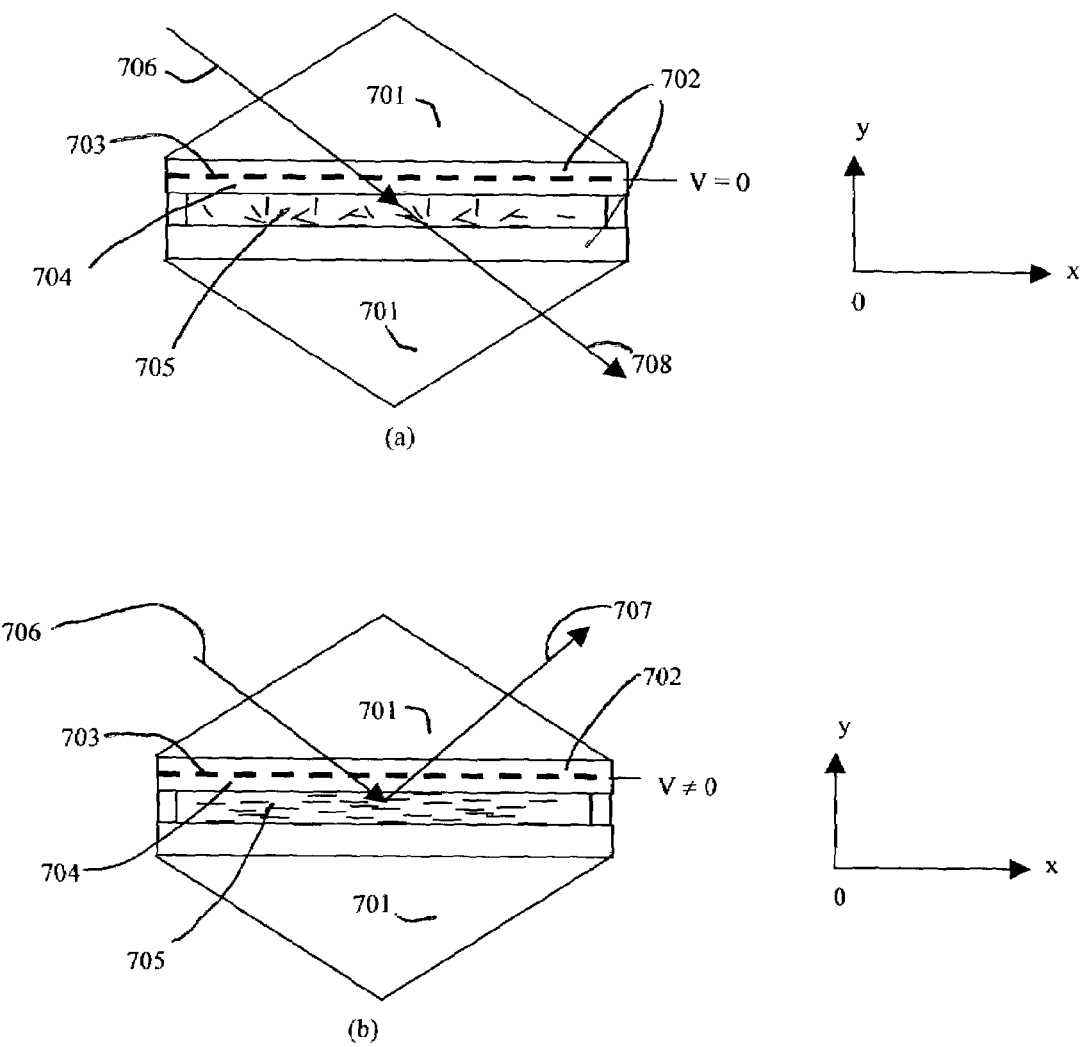
FIG. 7 illustrates another switchable element according to the current invention that is switched via in-plane switching technique, where the electrodes are in the optical path.

FIG. 7 shows the third switchable element in which the ITO electrodes (704) are patterned for in-plane switching and are within the optical path of the input and output beams. The liquid crystal (705) is sandwiched between two substrates (702). One of the substrates has the patterned ITO electrodes for in-plane switching. Between the ITO electrodes and the liquid crystal there is an optional index-matching layer (704). In this example, the liquid crystal has a positive dielectric anisotropy ($\Delta\epsilon \geq 0$). The coupling prisms (701) are made from glass with an index $n_G$.

Figure 8:
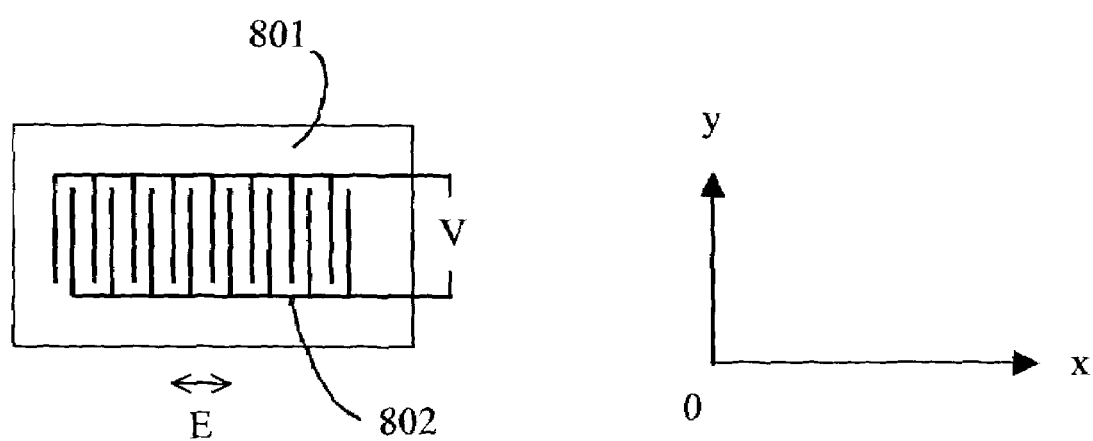
FIG. 8 illustrates the top view of the in-plane switching electrodes used in FIG. 7.

FIG. 8 shows the top view of the in-plane switching electrodes (802) on the substrate (801). Obviously, the applied electric field is in the "x" direction.

In the absence of an electric field, both "S" and "P" polarizations of an incident beam (706) are transmitted due to the index matching condition (FIG. 7(a)). When a sufficient voltage is applied, the liquid crystal is aligned along the electric field direction (i.e., "x" direction). Therefore, both "S" and "P" polarizations are reflected via the total internal reflection (FIG. 7(a)) based on the same argument in the previous example.

d. Switchable Element with In-Plane Switching Electrodes—II

Figure 9:
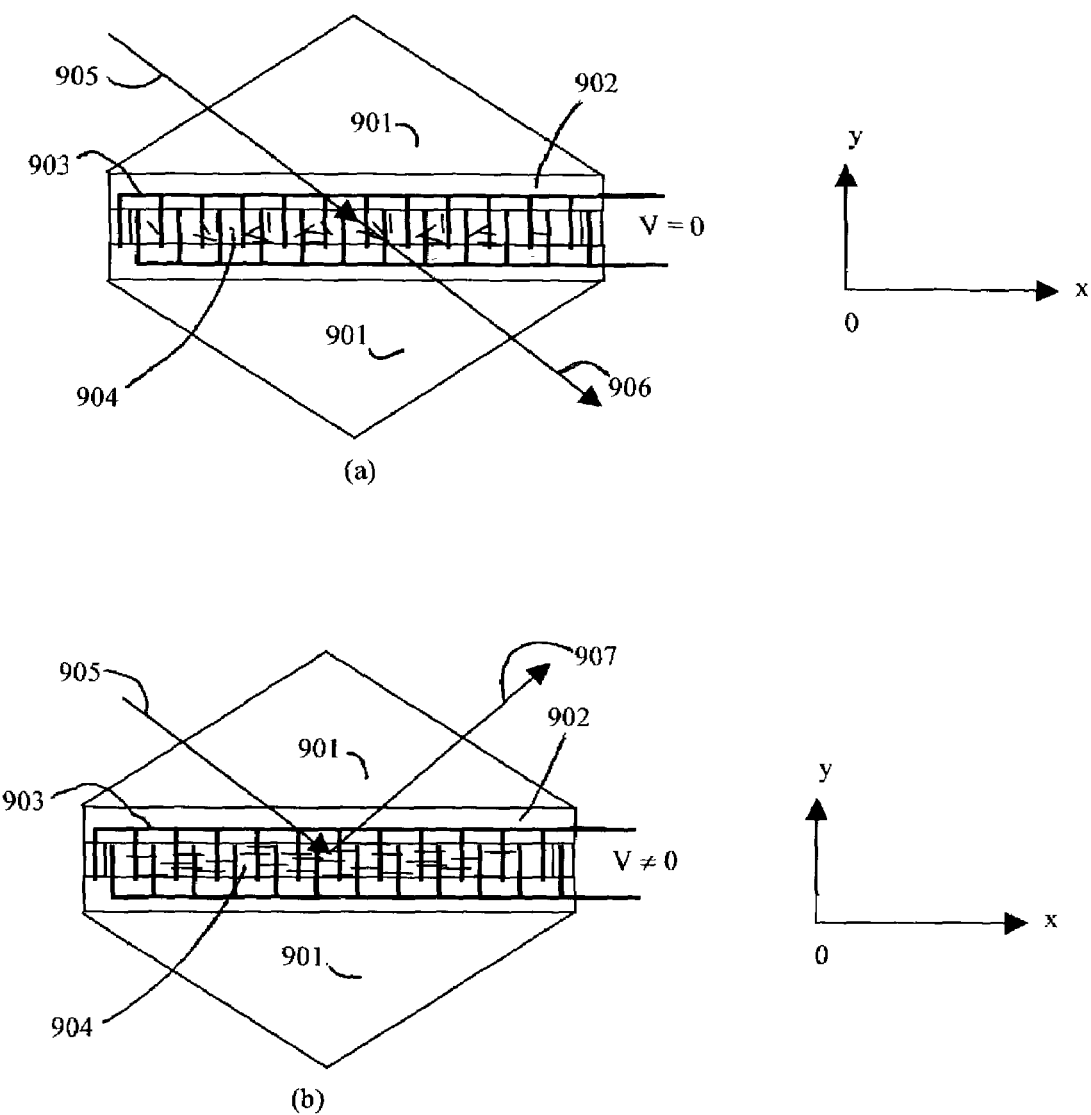
FIG. 9 illustrates a further switchable element according to the current invention that is switched via in-plane switching technique, where the electrodes are out of the optical path.

FIG. 9 shows the forth switchable element in which the in-plane switching electrodes (903) are at the side of the apparatus and out of the optical path. In this design, the liquid crystal (904) is sandwiched between the two bare substrates (902). The nematic liquid crystal (904) has a positive dielectric anisotropy ($\Delta\epsilon \geq 0$).

In the absence of an electric field, both "S" and "P" polarizations of the incident beam (905) are transmitted due to the index matching condition (FIG. 9(a)). When a sufficient voltage is applied, the nematic liquid crystal is aligned along the electric field direction (i.e., "x" direction). Therefore, both "S" and "P" polarizations are reflected via the total internal reflection (FIG. 9(a)).

e. Switchable Element with Negative Nematic ($\Delta\epsilon < 0$)—I

Figure 10:
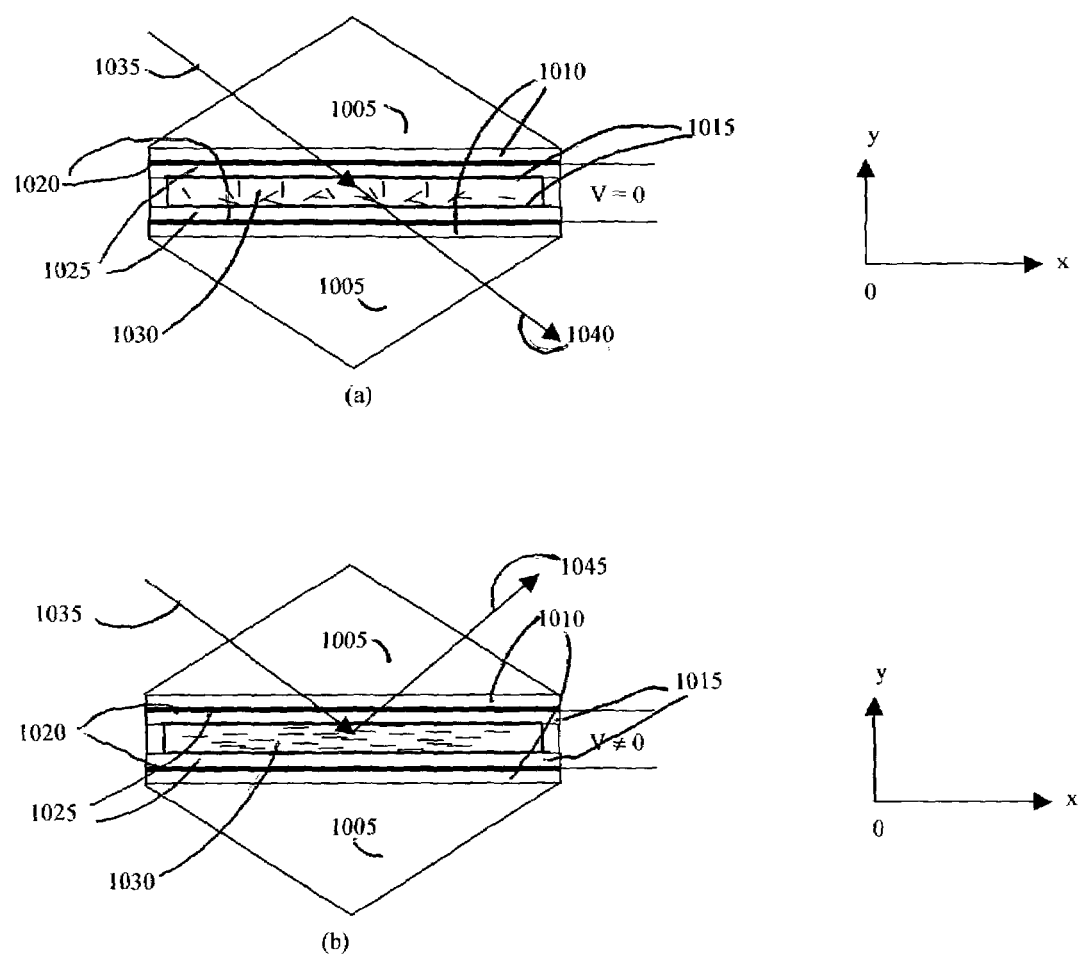
FIG. 10 illustrates another switchable element according to the present invention in which negative nematic (Δε<0) is used together with the electrodes that are within the optical path.

FIG. 10 shows the fifth switchable element in which the nematic liquid crystal (1030) has a negative dielectric anisotropy ($\Delta\epsilon \leq 0$). The substrates (1010) have ITO electrodes (1020) that are covered with an index matching coating (1025). The ITO electrodes are within the optical path of the input and output beams. An alignment layer (1015) (such as a rubbed polyimide) for homogeneous alignment is applied at the substrate surface. In this design, the coupling prisms (1005) are made from glass with an index $n_G$.

In the absence of an electric field, both "S" and "P" polarizations of the incident beam (1035) are transmitted due to the index matching condition (FIG. 10(a)). When a sufficient voltage is applied, the nematic liquid crystal is aligned along the rubbing direction of the polyimide coating, which is parallel to the substrate surface and within the incident plane (i.e., the "x" direction). Therefore, both "S" and "P" polarizations of the incident beam (1035) are reflected via the same total internal reflection (FIG. 10(a)).

f. Switchable Element with Negative Nematic ($\Delta\epsilon < 0$)—II

Figure 11:
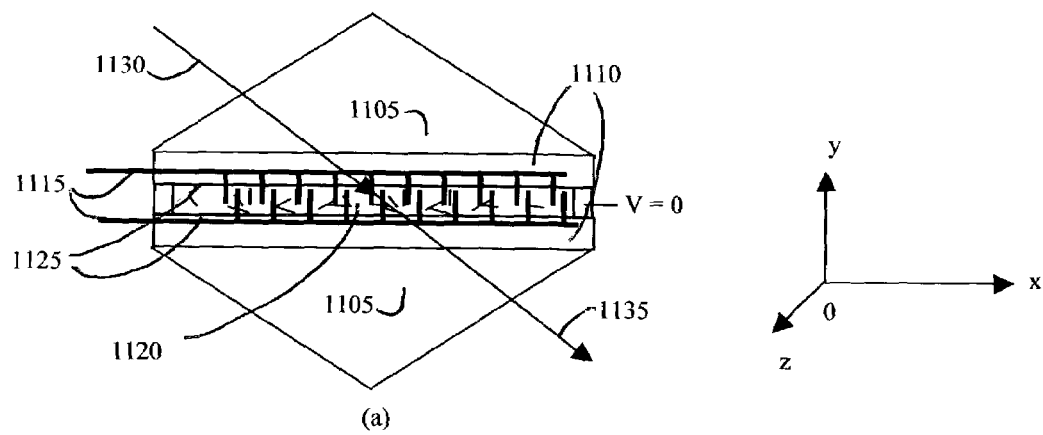
FIG. 11 is a schematic illustration of another switchable element according to the present invention in which negative nematic (Δε<0) is used while the electrodes are out of the optical path.
Figure 11:
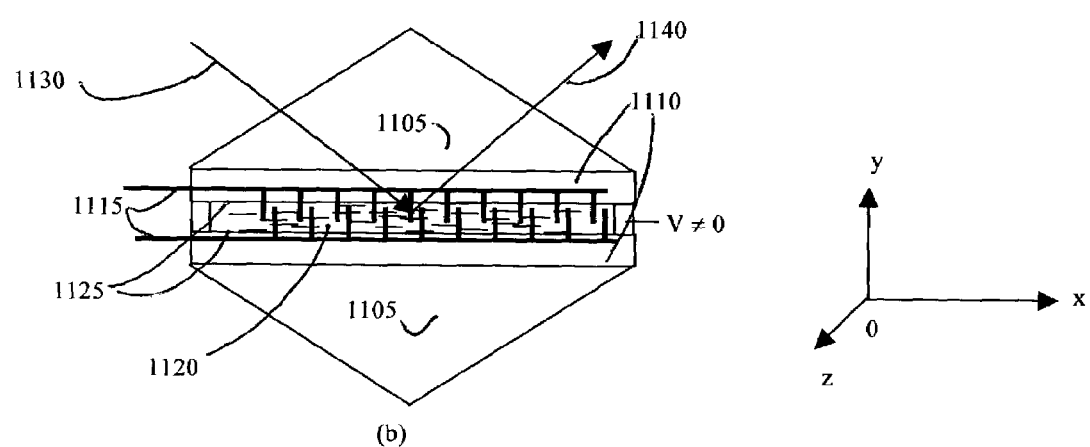

FIG. 11 shows the sixth switchable element in which the ITO electrodes (1115) for in-plane switching are located at the side of the element and therefore are outside the optical path. The nematic liquid crystal (1120) is sandwiched between two bare substrates (1110). An alignment layer (1125) (such as a rubbed polyimide) for homogeneous alignment is applied at the substrate surface. The nematic liquid crystal has a negative dielectric anisotropy ($\Delta\epsilon \leq 0$). In this design, the coupling prisms (1105) are made from glass with an index $n_G$.

In the absence of an electric field, both "S" and "P" polarizations of the incident beam (1130) are transmitted due to the index matching condition (FIG. 11(a)). When a sufficient voltage is applied (in the "z" direction), the nematic liquid crystal is aligned along the rubbing direction of the polyimide coating (i.e., the "x" direction), which is parallel to the substrate surface and within the incident plane. Therefore, both "S" and "P" polarizations of the incident beam (1130) are reflected via the same total internal reflection (FIG. 11(a)).

g. Switchable Element with In-Plane Switching Electrodes and Negative Nematic—I

Figure 12:
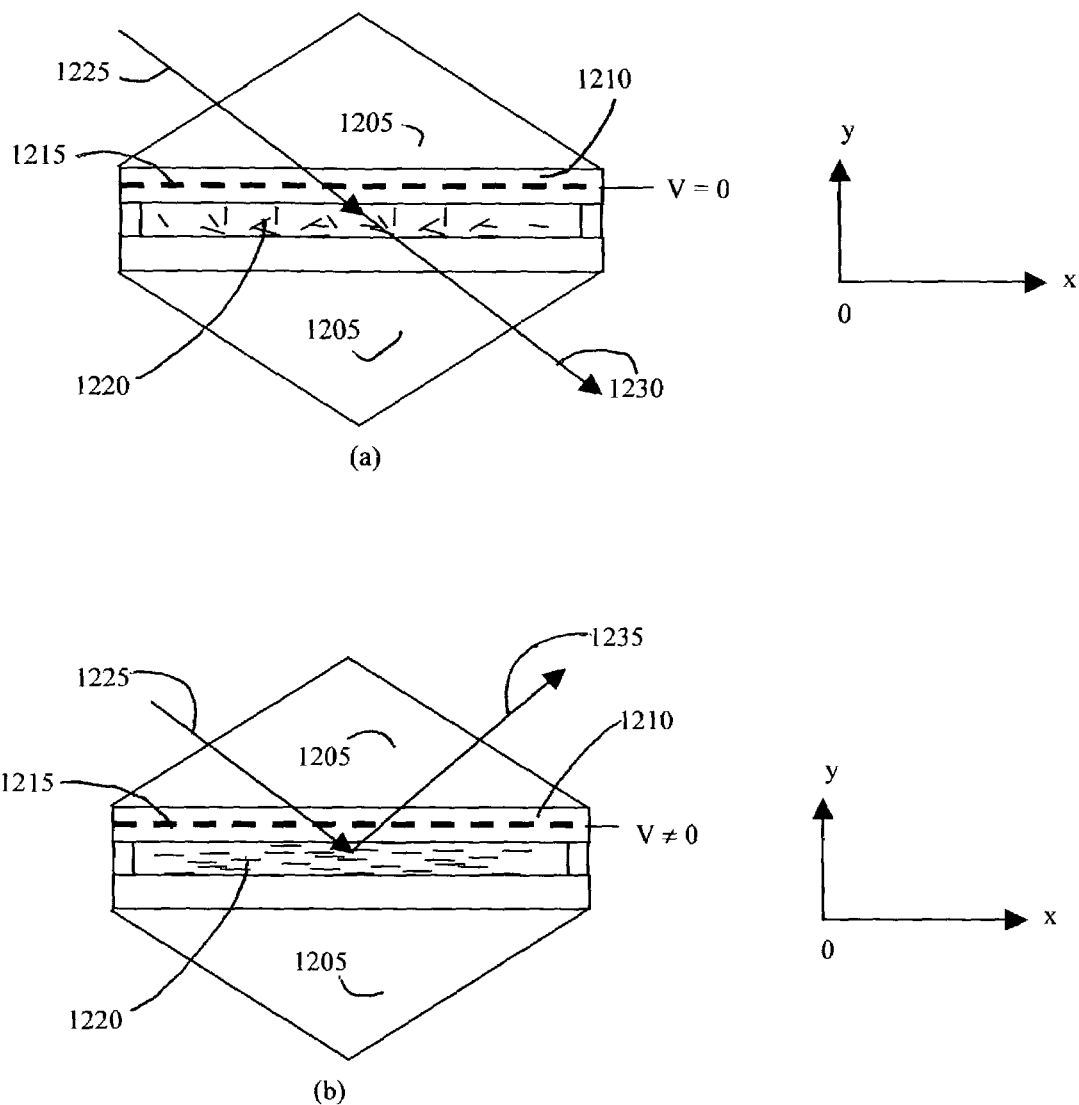
FIG. 12 illustrates a further switchable element according to the present invention in which negative nematic is utilized and the in-plane switching electrodes are in the optical path.

FIG. 12 shows the seventh switchable element in which the ITO electrodes (1215) for in-plane switching are within the optical path. The liquid crystal (1220) is sandwiched between the two substrates (1210). One of the substrates has the patterned ITO electrodes. The nematic liquid crystal has a negative dielectric anisotropy ($\Delta\epsilon < 0$). In this design, the coupling prisms (1205) are made from glass with an index $n_G$.

Figure 13:
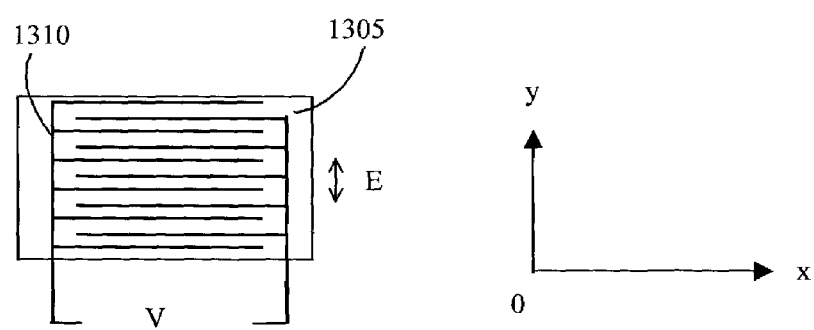
FIG. 13 illustrates the top view of the in-plane switching electrodes used in FIG. 12.

FIG. 13 shows the top view of another orientation of the electrodes (1310 on substrate (1305) for in-plane switching. As compared to FIG. 8, the electrodes (1310) are rotated by 90°. As a result, the applied electric field is in the "y" direction.

Figure 14:
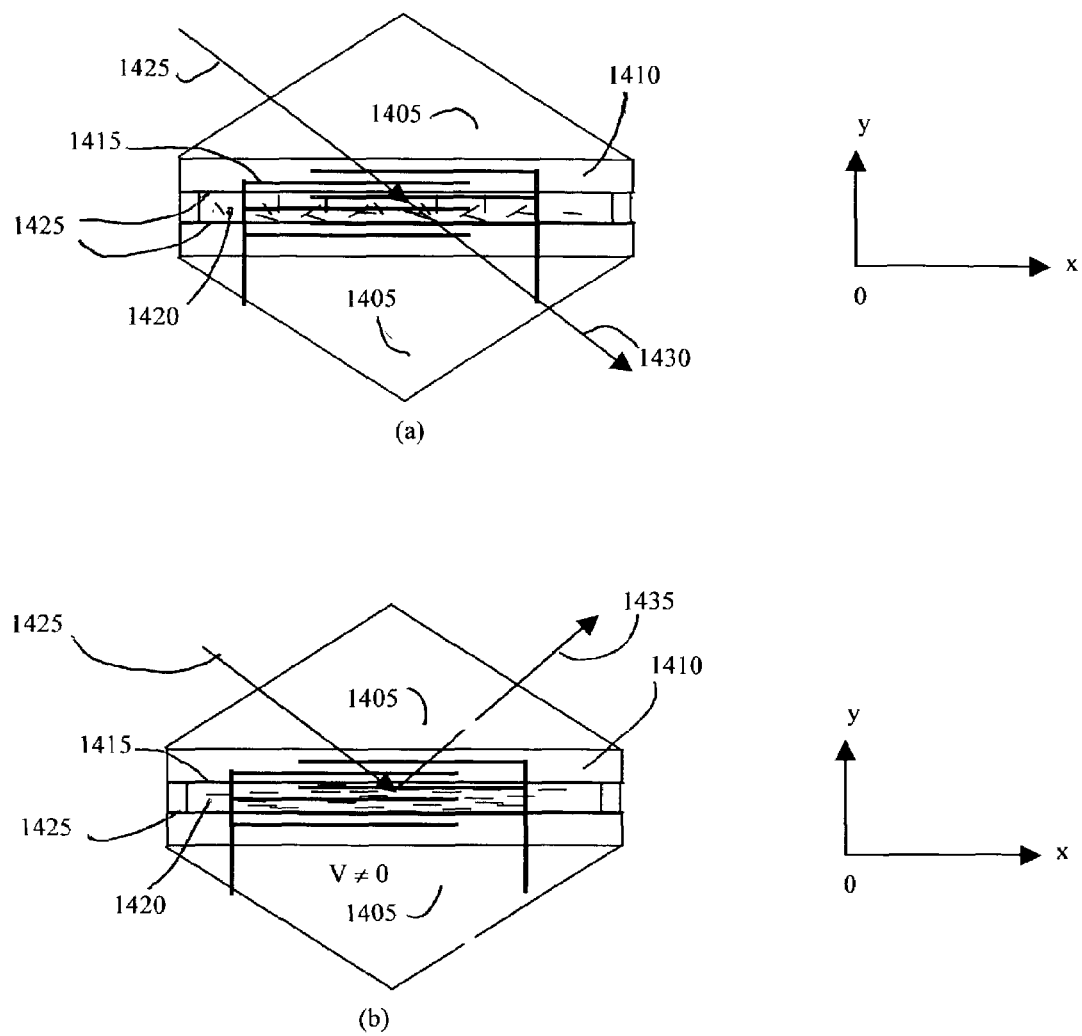
FIG. 14 illustrates a further switchable element according to the present invention in which negative nematic is utilized and the in-plane switching electrodes are out of the optical path.

In the absence of an electric field, both "S" and "P" polarizations of the incident light (1225) are transmitted due to the index matching condition (FIG. 12 (a)). When a sufficient voltage is applied, the nematic liquid crystal is aligned along the "x" direction which is perpendicular to the electric field direction due to the negative dielectric anisotropy ($\Delta\epsilon<0$). Therefore, both "S" and "P" polarizations are reflected via the same total internal reflection (FIG. 12 (b)).

h. Switchable Element with In-Plane Switching Electrodes and Negative Nematic—II FIG. 14 shows the eighth switchable element in which the ITO electrodes (1415) for in-plane switching are at the side of the element and are outside the optical path. The liquid crystal (1420) is sandwiched between two bare substrates (1410). The nematic liquid crystal has a negative dielectric anisotropy ($\Delta\epsilon<0$). Here, an alignment layer (1425) (such as a rubbed polyimide) for homogeneous alignment is applied to the substrate surface. The rubbing direction is parallel to the substrate surface and within the incident plane (i.e., the "x" direction). In this design, the coupling prisms (1405) are made from glass with an index $n_G$.

In the absence of an electric field, both "S" and "P" polarizations of an incident light (1430) are transmitted due to the index matching condition (FIG. 14(a)). When a sufficient voltage is applied, the nematic liquid crystal is aligned parallel to the substrate surface and within the incident plane (i.e., the "x" direction) due to the negative dielectric anisotropy ($\Delta\epsilon<0$) and anchoring force by the polyimide. Therefore, both "S" and "P" polarizations are reflected via the same total internal reflection (FIG. 14(b)).

B. Waveguide Switchable Element

Similar principles can be employed in constructing waveguide switchable.

Figure 15:
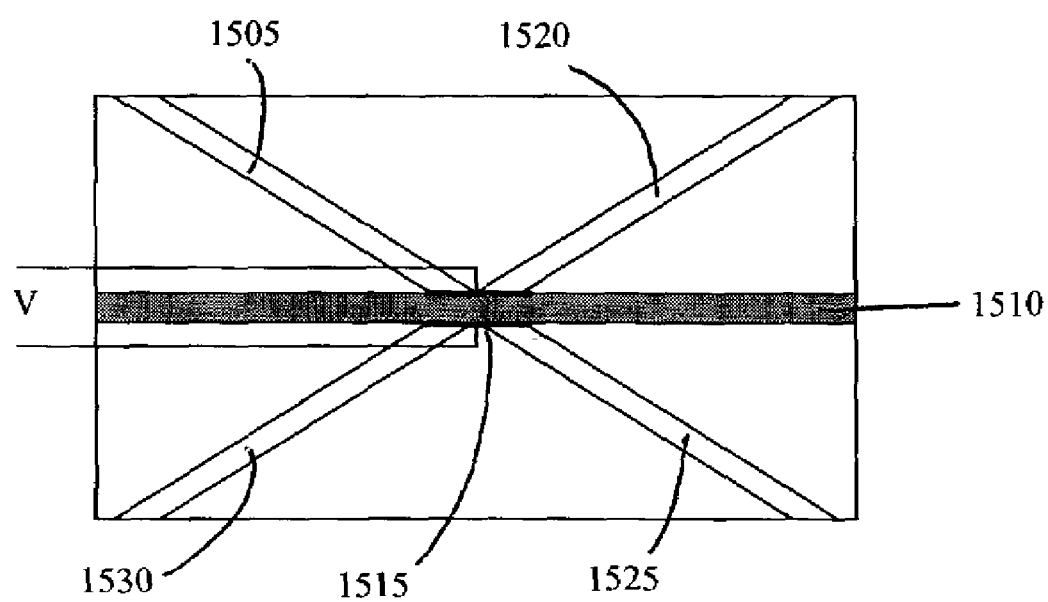
FIG. 15 illustrates the first type waveguide switchable element

The first type waveguide switchable element has a configuration as shown in FIG. 15, where the electrodes (1515) are located along the two sidewalls of the trench (1510) in which a liquid crystal is filled. The waveguides (1505, 1520, 1525, and 1530) intersect the trench. This element itself serves as a "2×2" switch. In this configuration, liquid crystal with negative dielectric anisotropy ($\Delta\epsilon<0$) is preferred. An alignment coating for homogeneous alignment is preferred at the sidewalls of the liquid crystal trench. It is preferred that the alignment direction of the alignment layer be along the trench length direction.

The liquid crystal is in isotropic state under zero voltage. Its isotropic refractive index $n_{iso}$ equals to that of the waveguide. The trench intersects the waveguide at an angle to meet the total internal reflection condition. In the absence of an electric field, the incident beam from one input waveguide (1505) is transmitted by the liquid crystal trench (1510) and travels straight into the output waveguide (1525) due to the index matching condition. When a sufficiently strong voltage is applied, the nematic liquid crystal is aligned along the trench length direction. As a result, both "S" and "P" polarizations of the incident light are totally internally reflected if both ordinary index $n_o$ and effective index $n_{eff}$ of the liquid crystal are smaller than that of the waveguide. As a result, the waveguided beam from the input waveguide (1505) is routed into the output waveguide (1520).

Figure 16:
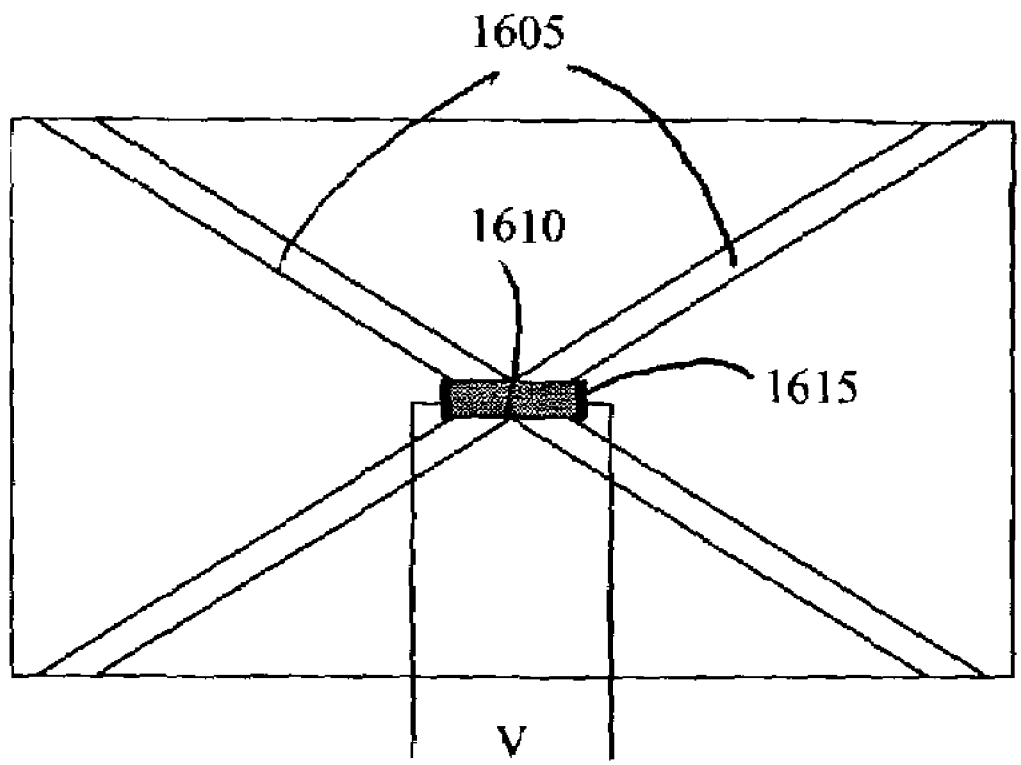
FIG. 16 illustrates the second type waveguide switchable element.

The second type waveguide switchable element has a configuration as shown in FIG. 16, where the electrodes (1615) are located at the two ends of the liquid crystal trench (1610). The waveguides (1605) are crossed with the trench. This element itself also serves as a "2×2" switch. In this configuration, liquid crystal with positive dielectric anisotropy ($\Delta\epsilon>0$) is preferred. No extra alignment coat is necessary in this configuration.

The liquid crystal is in isotropic state under zero voltage. Its isotropic refractive index $n_{iso}$ equals to that of the waveguides. The trench intersects the waveguide at an angle to meet the total internal reflection condition. In the absence of an electric field, the incident beam from one waveguide is transmitted by the liquid crystal trench due to the index matching conditioned. When a sufficiently strong voltage is applied, the nematic liquid crystal is aligned along the trench direction. As a result, both "S" and "P" polarized light components are reflected.

Figure 17:
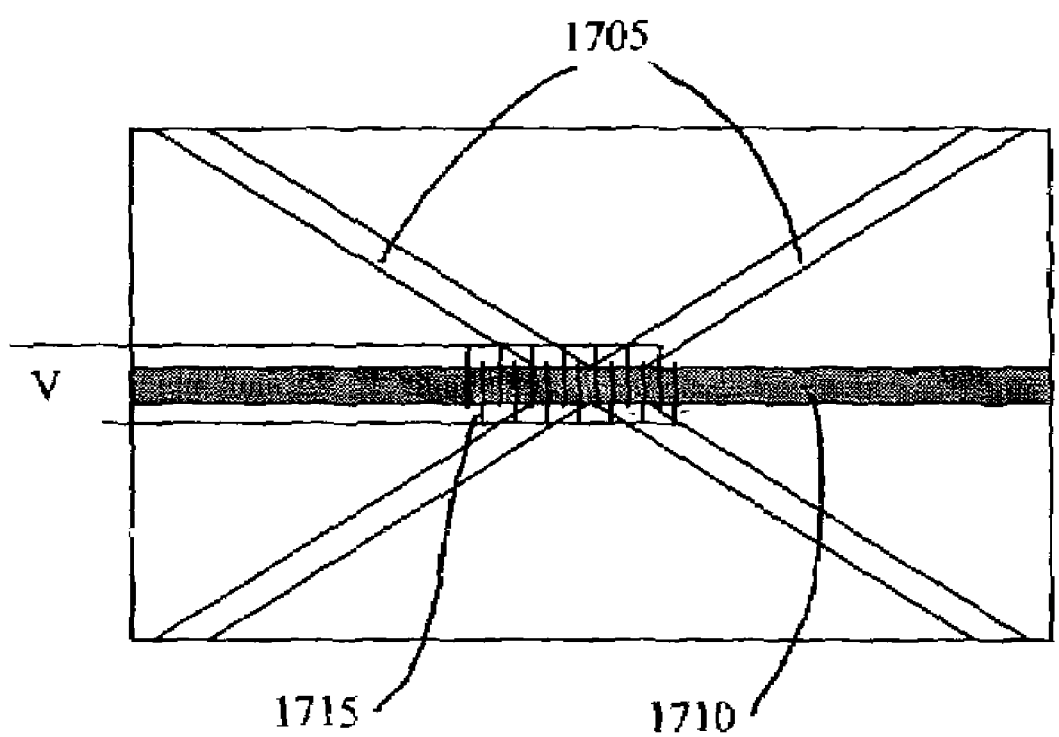
FIG. 17 illustrates the third type waveguide switchable element.
Figure 18:
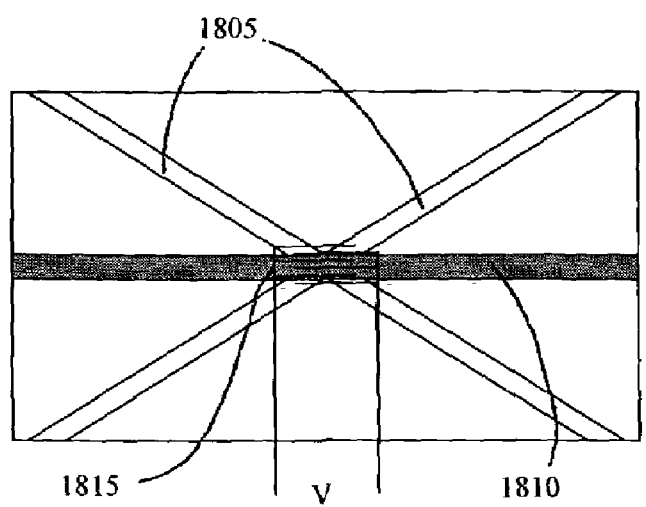
FIG. 18 illustrates a derivative format of the third type waveguide switchable element with rotated in-plane switching electrodes.

The third type waveguide switchable element has a format as shown in FIG. 17, where the electrodes (1715) for in-plane switching are located on top of the liquid crystal trench (1710). The waveguides (1705) are crossed with the trench. This element itself also serves as a "2×2" switch. In this configuration, liquid crystal with positive dielectric anisotropy ($\Delta\epsilon>0$) is preferred. However, if the in-plane switching electrodes are rotated by 90° (see the electrodes (1815) in FIG. 18), nematic liquid crystal with negative dielectric anisotropy ($\Delta\epsilon>0$) is preferred. No extra alignment coat is necessary in this configuration.

Similarly, the liquid crystal is in isotropic state under zero voltage. In the absence of an electric field, the incident beam from one waveguide is transmitted by the liquid crystal trench due to the index matching condition. When a sufficiently strong voltage is applied, the liquid crystal is aligned along the trench direction. As a result, both "S" and "P" polarized components are reflected.

Figure 19:
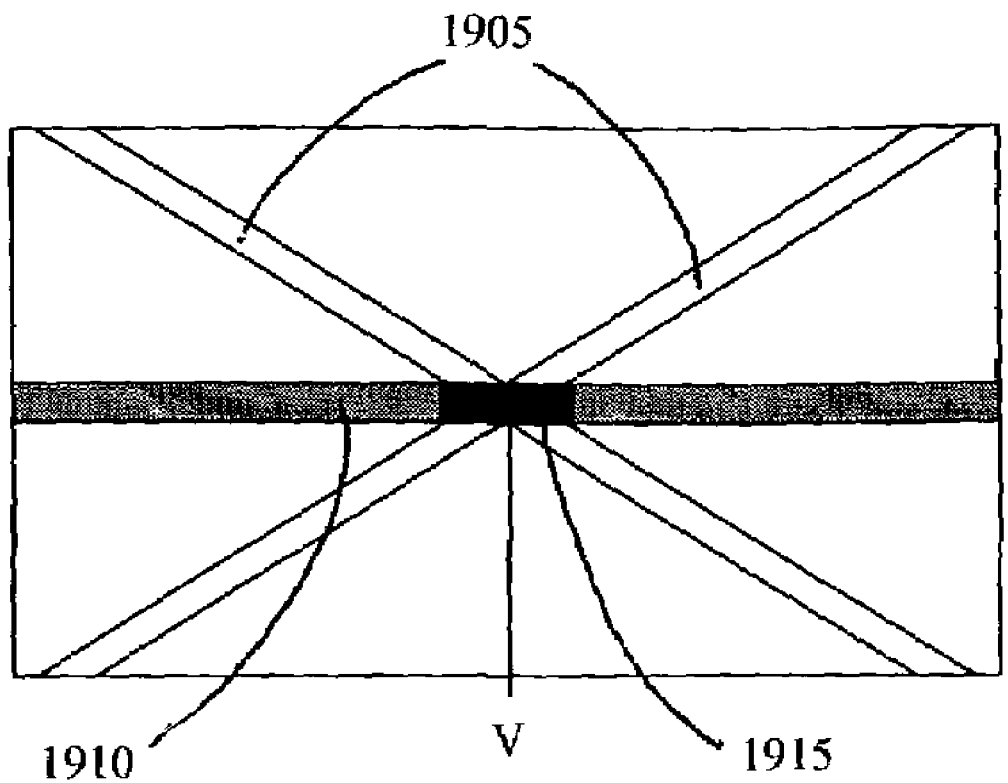
FIG. 19 illustrates the forth type waveguide switchable element with electrodes located on top and bottom of the trench.

The forth type waveguide switchable element has a configuration as shown in FIG. 19, where the solid electrodes (1915) are located on top and bottom of the liquid crystal trench (1910). The waveguides (1905) are crossed with the trench. This element itself also serves as a "2×2" switch. For this configuration, the liquid crystal with negative dielectric anisotropy ($\Delta\epsilon<0$) is preferred. An alignment coating for homogeneous alignment is preferred at the bottom and top of the liquid crystal trench.

Similarly, the liquid crystal is in isotropic state under zero voltage. In the absence of an electric field, the incident beam from one waveguide is transmitted by the liquid crystal trench due to the index matching condition. When a sufficiently strong voltage is applied, the liquid crystal is aligned along the trench direction. As a result, both "S" and "P" polarized components are reflected.

Figure 20:
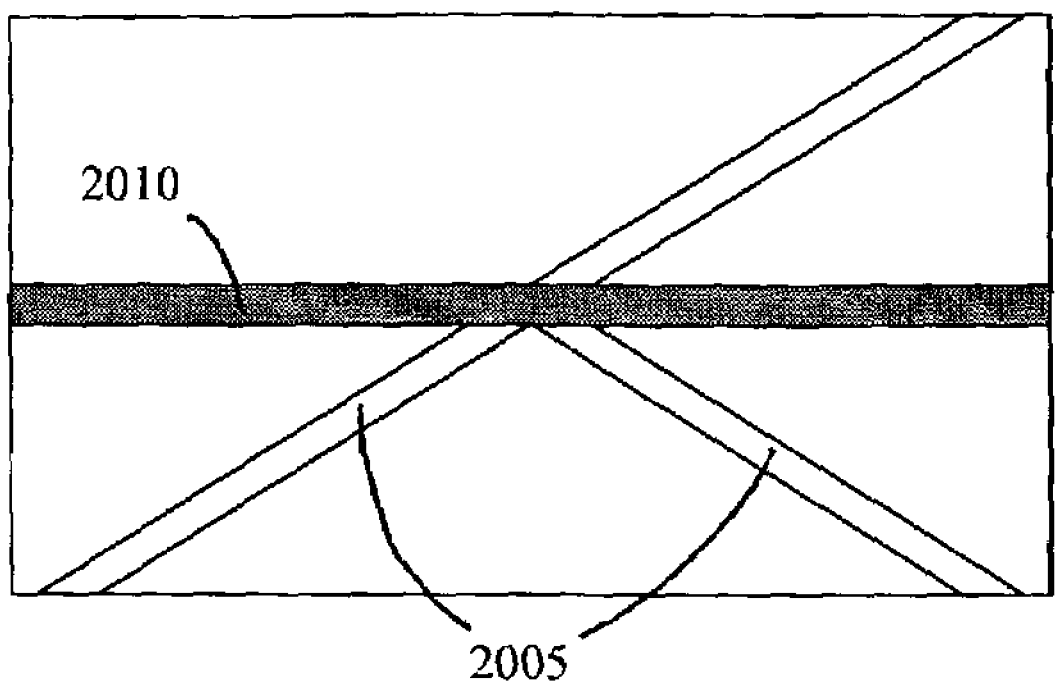
FIG. 20 illustrates another exemplary waveguide switchable element with "Y" shaped waveguides.

All these waveguide switchable elements have "X" shaped waveguides. It is then understood that "Y" shaped waveguides are also applicable, as shown in FIG. 20, which is a "1×2" switch. All the electrode arrangements and configurations described in the previous example can be adopted.

The following is the second embodiment that describes the optical switch matrixes that are made from the single switchable elements in the first embodiment.

A. Free Space Optical Switch Matrix

Figure 21:
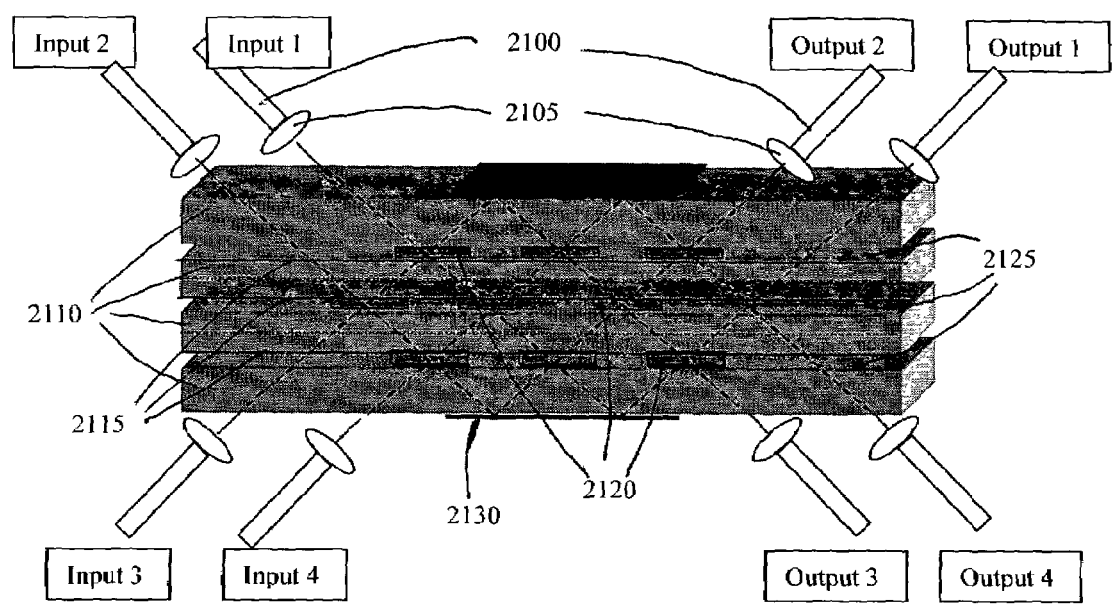
FIG. 21 schematically illustrates a 4×4 free space switch matrix.

FIG. 21 shows a schematic of a desired 4×4 switch array configuration according to the present invention. It should be noted that although there may be an alternative arrangement for the liquid crystal mirror elements, however, the spirit using the single layer switchable liquid crystal mirror to build the switch array remains the same.

The switch consists of three pixilated liquid crystal elements comprising substrates (2110) with patterned ITO electrodes (2120) and un-patterned ITO electrodes (2115).

The switch array is made from the liquid crystal switchable mirror elements as described in the first embodiment, which contains liquid crystal (2125) sandwiched between solid substrates 2110 (e.g., glass and/or plates). The pixilated switchable elements are electrically isolated from each other by using pixilated conductive electrodes (2120), such as Indium-Tin-Oxide (ITO). Each mirror element is independently addressed in a similar way used in liquid crystal display. The ITO electrodes are further covered with an optional index-matching layer (not shown). This 4×4 router switch has passive mirrors (2130) at the top and bottom surface of the switch array and a coupling prism array at each side of the switch (which is represented by "Coupling optics" (2105) inside FIG. 21), which couples the waveguide beams from the fiber (2100) into the switch array, or vice versa. With the use of these passive mirrors, a true "4×4" router switch is constructed that allows any random combination of the output signals.

The pixilated ITO can also be patterned (FIG. 8 or 13) for in-plane switching operation. However, when the in-plane switching electrodes are used, the un-patterned ITO electrodes are not necessary.

Switching principle of each switchable element is the same as described in the previous embodiments. The liquid crystal has an isotropic refractive index $n_{ISO}$ that is chosen to equal to that of the substrates. In the absence of an electric field, the liquid crystal switchable mirror elements are transparent to the light beams hitting the elements. Therefore, the incident beam passes through the switchable mirror element and travels straight into the output fiber. In the presence of a sufficient electric field, the liquid crystal is such aligned that its refractive indices for both "S" and "P" polarization are smaller than $n_{ISO}$. The incident beam is totally internally reflected by the activated switchable mirror element and routed into another output fiber.

B. Waveguide Optical Switch Matrix Array

Figure 22:
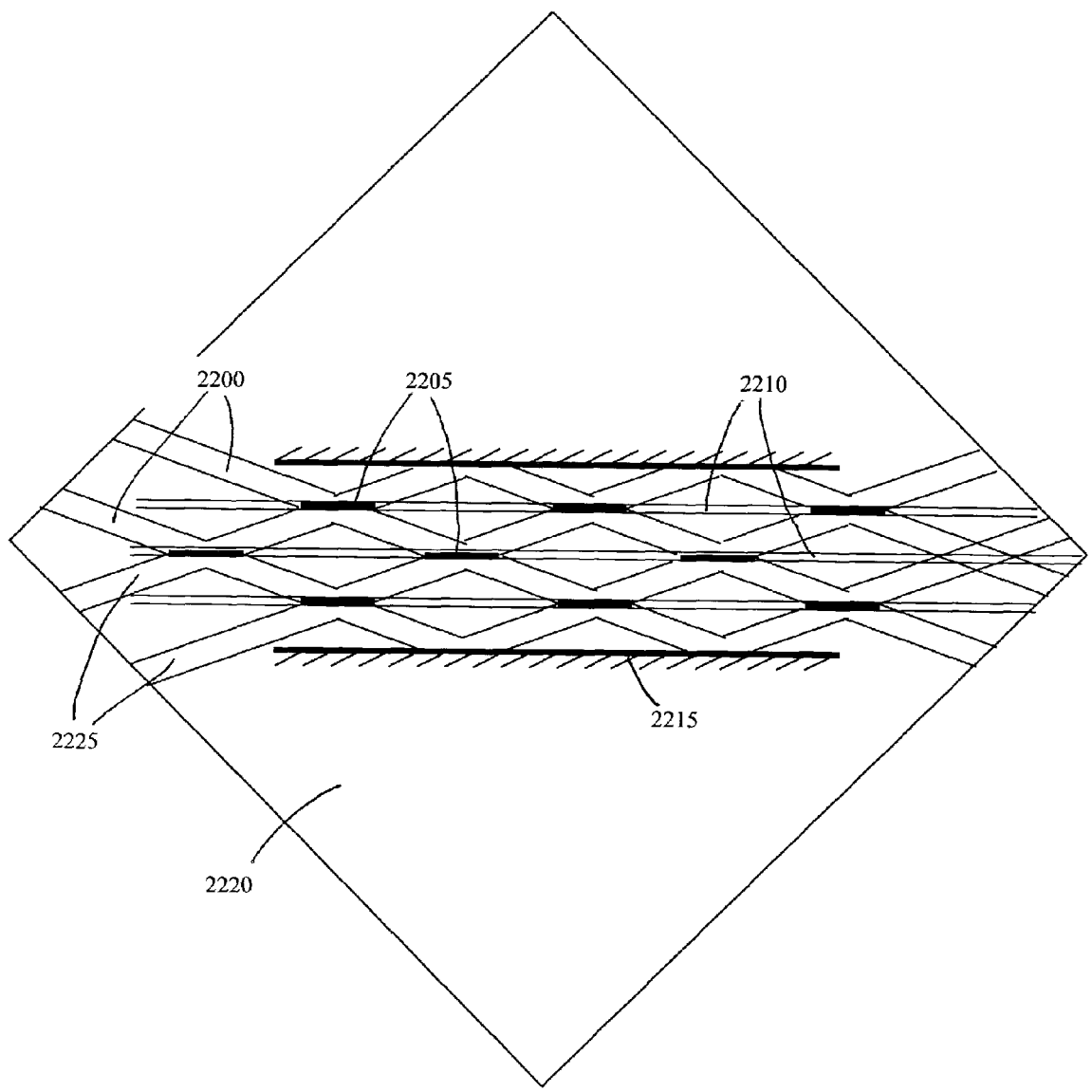
FIG. 22 illustrates an exemplary waveguide optical switch matrix.

Optical switch matrix array can also be manufactured on a planar light-wave circuit (PLC) chip. FIG. 22 schematically illustrates a possible configuration (top view) of a 4×4 waveguided optical switch matrix array. It is understood that all the four basic waveguide switchable element configurations as shown in FIGS. 15–20 are useable in constructing such waveguided switch matrix array. To switch, the nematic liquid crystal is aligned by the electric field through the corresponding electrodes. The switching mechanism is the same as described in the previous embodiments.

On the waveguide substrate (2220), there are arrays of two waveguides, i.e., the array of first waveguide (2200) and array of second waveguides (2225). There is an array of trenches (2210) in which a liquid crystal is filled. The array of the first waveguides (2200) intersect the array of the second waveguides (2225) at the liquid crystal trench (2210). At the intersection locations, there are electrodes (not shown) in electrical connection with the liquid crystal, upon which an electric field is applied to reorient the liquid crystal. Therefore, liquid crystal switchable mirror elements (2205) are formed. These switchable elements are electrically isolated from each other due to the pixilated electrodes.

The liquid crystal has an isotropic refractive index $n_{ISO}$ that is chosen to equal to that of the waveguides. In the absence of an electric field, the liquid crystal switchable mirror elements are transparent to the waveguided beams hitting the elements. Therefore, the incident waveguided beam from an incident waveguide passes through the switchable mirror element and travels straight into the opposite waveguide that is on the other side of the switchable mirror. In the presence of a sufficient electric field, the liquid crystal is such aligned that its refractive indices for both "S" and "P" polarization are smaller than $n_{ISO}$. The waveguided beam from one waveguide is totally internally reflected by the switchable mirror element and routed into another waveguide that is located at the same side of the switchable mirror with the incident waveguide.

In this switch array, optional passive air trenches (2215) are used as passive reflectors that reflect the incident light beam(s) from waveguides (2200) via total internal reflection since the air refractive index is smaller than that of the liquid crystal as well as the waveguide. With the use of these passive reflectors, a true "4×4" router switch is constructed that allows any random combination of the output signals.

It is further understood that such basic block can be used to construct larger port optical cross connect switches via the well know cascade apparatus.

The following is the third embodiment related to the fabrication procedure for the optical switch array.

(a) Fabrication Procedure for Free Space (Non-Waveguide) Switch Array

Figure 23:
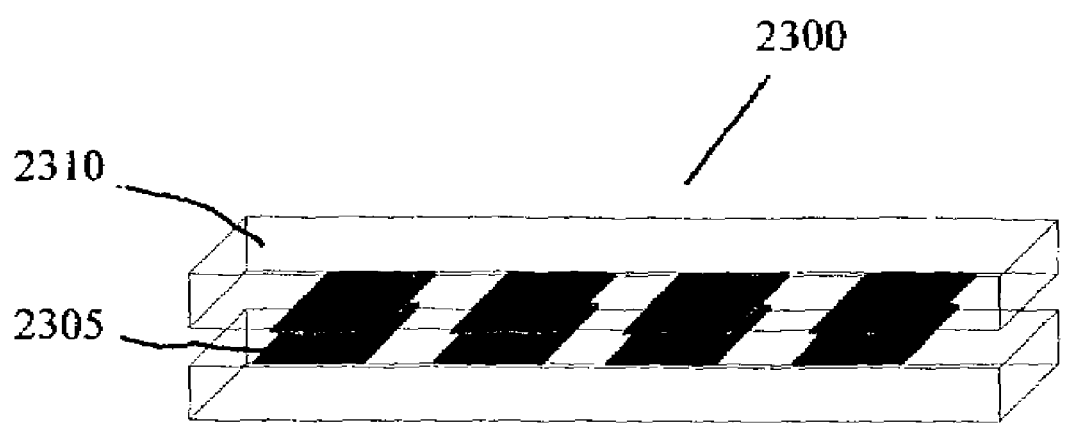
FIG. 23 illustrates an exemplary empty liquid crystal cell with four pairs of electrode.

The following fabrication method is described for constructing the free space cross connect optical switch array as shown in FIG. 21. First individual empty liquid crystal cells 2300 are assembled, as shown in FIG. 23. While each cell has the structure as shown by the four pairs of electrodes 2305, this number has been selected only for illustration purposes and does not limit the number of electrodes which could be fewer than four, or any number larger than the electrodes are arranged on substrate 2310. If a positive liquid crystal is used, the pixilated ITO electrodes are patterned into the comb-like structure for in-plane switching which are located on only one substrate surface.

The empty cells are then stacked, aligned to a proper position to each other and fixed to each other using the similar way used in liquid crystal display (LCD) fabrication.

Figure 24:
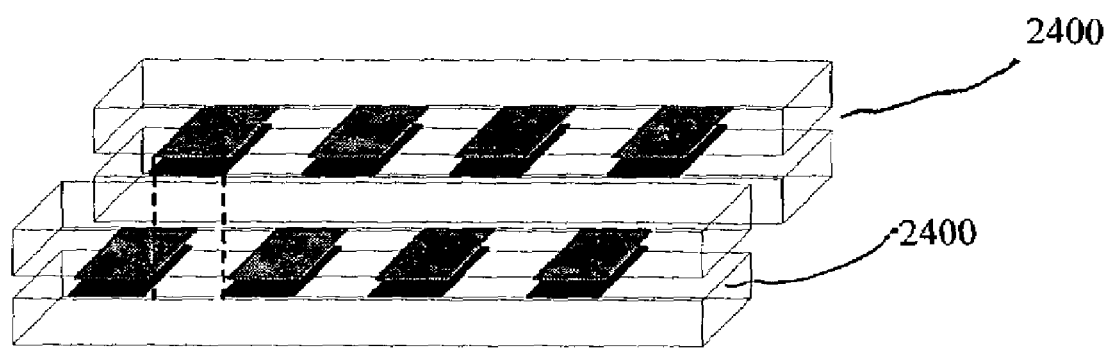
FIG. 24 illustrates aligned and stacked liquid crystal cells.

FIG. 24 shows the stacked and aligned liquid crystal cells 2400, where only two cells are shown as an example.

Figure 25:
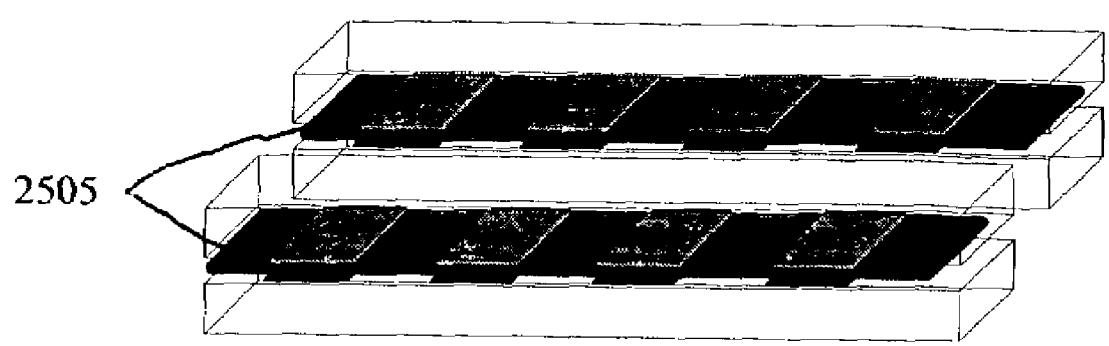
FIG. 25 illustrates the stacked liquid crystal cells to form an optical switch matrix.

Next, liquid crystals are filled into the stacked cells via the standard vacuum filling method employed in the liquid crystal display industry. FIG. 25 illustrates how the structure looks after the step of filling the liquid crystal 2505 into the stacked cells. Finally, the openings of the whole device are sealed.

There might be an optional step of coating an alignment layer on to substrates before they are assembled together to form a cell.

It is understood by persons of ordinary skill in the art that there are many variations to the present invention which are within the spirit of the invention and the scope of the appended claims.

(b) Fabrication Procedure for Waveguide Switch Matrix

The fabrication procedure consists of the following general steps.

Creating an array of liquid crystal trenches via photolithography process on a provided waveguide substrate having arrays of crossed waveguides. Each trench intersects the crossed waveguides at the intersection positions of the crossed waveguides.

Figure 26:
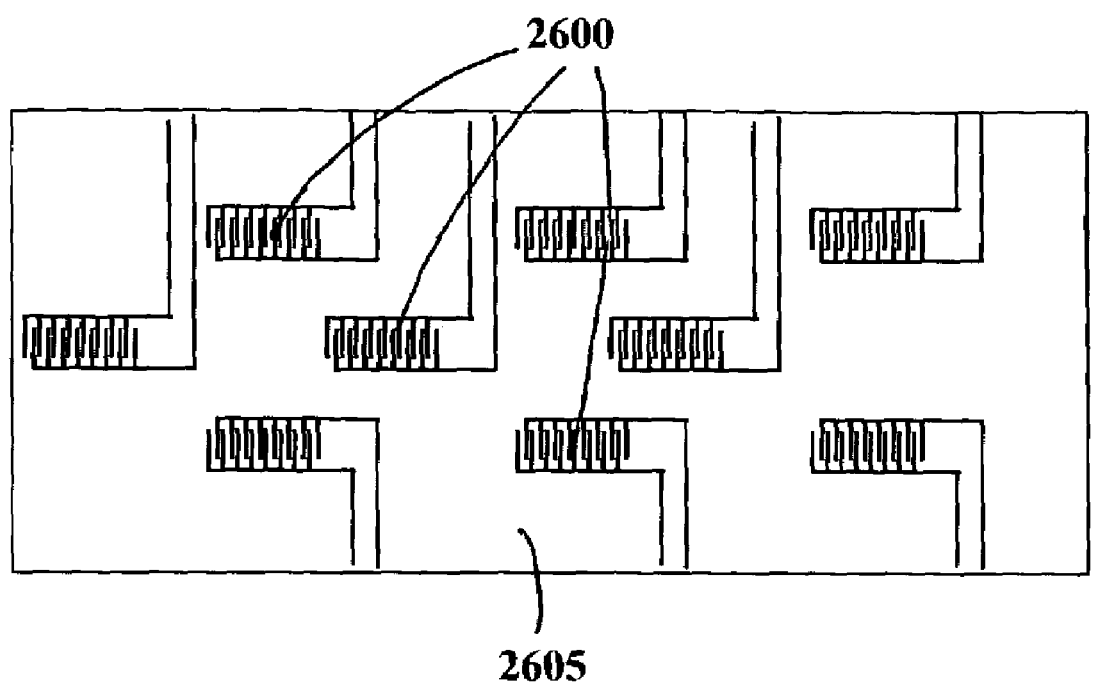
FIG. 26 illustrates the substrate with patterned ITO electrodes for in-plane switching.

Creating electrodes, preferably ITO electrodes, on the side walls of the trenches. As an alternative, the electrodes can be created on the bottom of the trenches and/or on a separate substrate that will be used as the cover substrate. If in-plane switching scheme is used, the in-plane switching electrodes are created only on the cover substrate, as shown in FIG. 26 where the in-plane switching electrodes (2605) are created on the surface of the substrate (2600).

Coating optional alignment layer on the walls of the trenches and/or on the cover substrate surface, if required. It is further preferred that the alignment layer is a UV alignable polymer film whose alignment direction is determined by the linear polarization direction of the linearly polarized UV light.

Covering the whole workpiece with the cover substrate and sealing the edges except the trench openings.

Filling the trenches with the liquid crystal through the trench openings via vacuum filling apparatus, and finally Sealing the final opening at the trench end.

It should be pointed out that the detailed procedure might change in the real practice. However, the spirit should remain the same.

Figure 27:
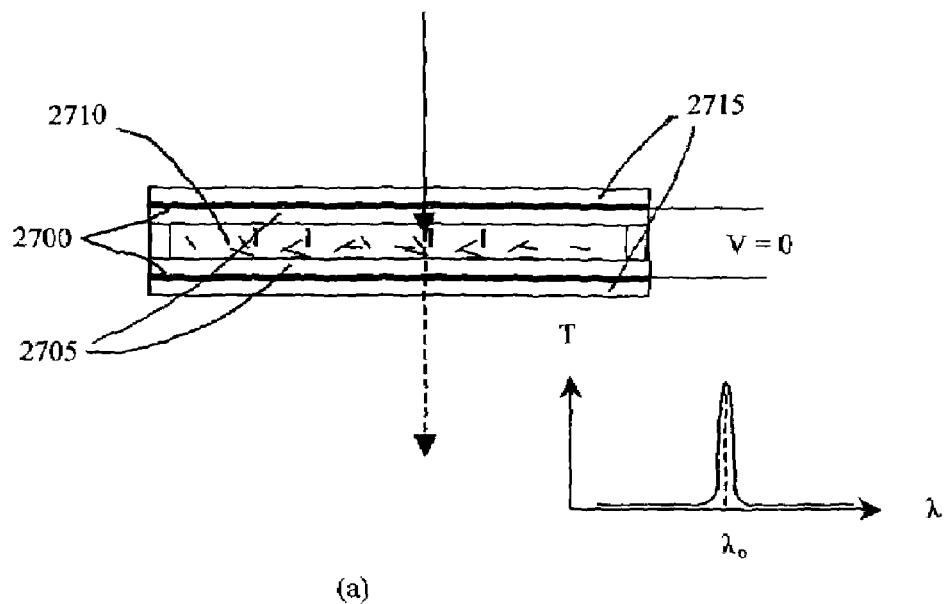
FIG. 27 schematically illustrates an electrically tunable Fabry-Perot Filter based on the principle of the present invention.
Figure 27:
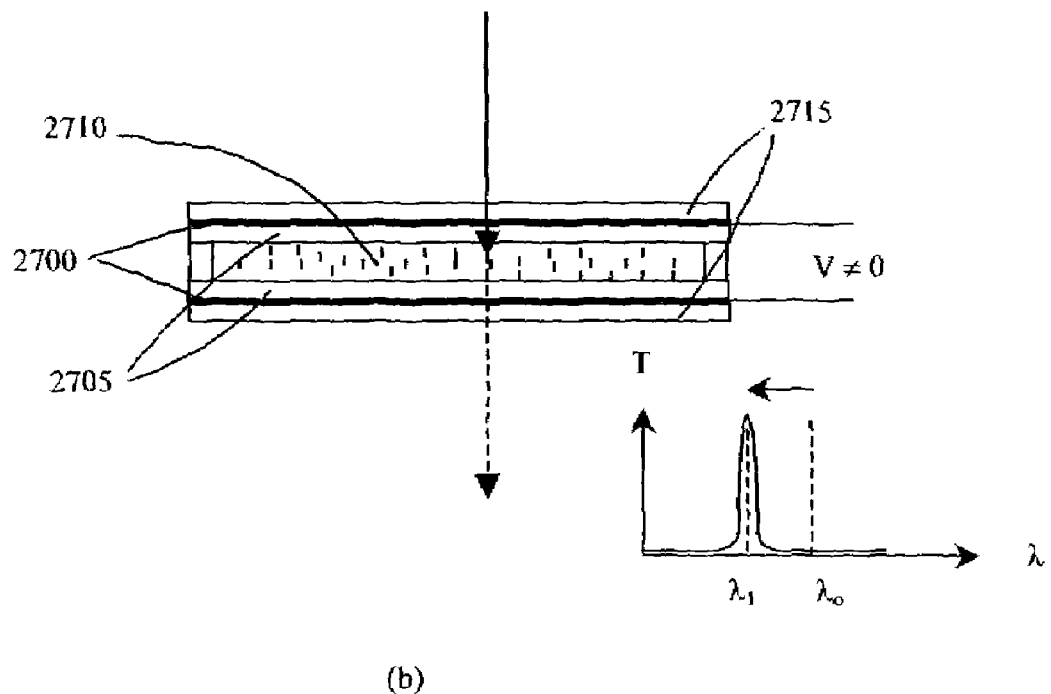

The following is the forth embodiment for a tunable Fabry-Perot interference filter using the similar principle for the switch technology, which is based on the fact that the refractive index of a liquid crystal at a temperature above its isotropic transition is changeable by altering the strength of an applied electric field. Therefore, an electrically tunable Fabry-Perot interference filter is constructed by incorporating a pair of partially reflection coatings at the interfaces between the liquid crystal and substrates. FIG. 27 shows the schematic illustration of such a tunable optical filter that is structurally similar to the single layer free space switchable element except that the coupling prisms are remove and a pair of partially reflection coatings are added. The liquid crystal (2710) is sandwiched between two substrates (2715) that have the partially reflection coating (2700) and an optional alignment coating (2705).

Tuning of the filter spectrum is realized via changing the electric voltage applied across the device. It has been taught in the previous embodiments that an isotropic liquid crystal exhibits a refractive index of $n_{iso}=[(2n_o^2+n_e^2)/3]^{1/2}$ in the absence of an electric field. Under this situation, the device transmits a series of narrow banded peaks at the wavelengths $\lambda_o \propto \sim d/N$, where N=1, 2, . . . is an integral and d is the spacing between the two partially reflection coatings. Under a sufficiently strong field, the liquid crystal is completely aligned along the electric field and exhibits an ordinary index $n_o$ for a normal incident light if the liquid crystal has a positive dielectric anisotropy ($\Delta\epsilon>0$). Therefore, the transmission wavelengths of the device are shifted to $\lambda_1 \propto n_o \sim d/N$, as schematically shown in FIG. 27, where only one peak is shown for illustration. In the intermediate voltage, the liquid crystal has an effective index $n_{eff}(V)$ such that $n_o < n_{eff}(V) < n_{ISO}$. Since the effective index $n_{eff}(V)$ can be continuously varied between $n_o$ and $n_{iso}$, the transmission peaks of the device are continuously tuned. In addition, since the refractive index under any voltage is rotational invariant around the substrate normal, this filter is polarization insensitive for a normal incident light.

What is claimed is:

1. An apparatus for switching a beam of light, comprising:
a first liquid crystal material transparent to the beam of light;
a second material transparent to the beam of light, the second material contacting the first liquid crystal material at an interface;
wherein a temperature of the first liquid crystal material is above a clearing temperature and wherein the first liquid crystal material has a first and a second state, the first state being an isotropic state in the absence of an external field, the second state being a forced nematic state in the presence of said external field, and wherein the index of refraction of the liquid crystal material in the first state matches the index of refraction of the second material, and wherein the index of refraction of the first liquid crystal material in the second state does not match the index of refraction of the second material, whereby the beam of light incident on the interface at an angle greater than the critical angle for total internal reflection is not reflected when the first liquid crystal material is in the first state, and whereby the beam of light incident at the angle on the interface is reflected when the first liquid crystal material is in the second state.

2. The apparatus according to claim 1, wherein is a the external field is a electric field.

3. The apparatus according to claim 2 further comprising electrodes in electrical connection with the first liquid crystal.

4. The electrodes in claim 3 are in-plane switching electrodes.

5. The apparatus according to claim 3 further comprising an index matching layer between the electrodes and the first liquid crystal material.

6. The apparatus according to claim 3 further comprising an alignment layer directly contacting the first liquid crystal material.

7. The apparatus according to claim 3, wherein the electrodes are pixilated.

8. The switch matrix element comprising:
a plurality of the apparatuses in claim 7 comprising said liquid crystal in stacked cells;
each one apparatus of the plurality of the apparatuses including pixilated electrodes that are electrically isolated from pixilated electrodes of other apparatuses of the plurality of the apparatuses;
a plurality of substrates transparent to a beam of light, the plurality of the substrates being alternatively arranged between the plurality of the apparatuses so that each one apparatus is separated from the other apparatuses by the arrangement of the plurality of substrates;
wherein the liquid crystal material has a first and a second state, and wherein the index of refraction of the liquid crystal material in the first state matches the index of refraction of the substrates, and wherein the index of refraction of the first liquid crystal material in the second state does not match the index of refraction of the substrates, whereby the beam of light incident on the interface of a pixilated apparatus at an angle greater than the critical angle for total internal reflection is not reflected when the first nematic liquid crystal material is in the first state, and whereby the beam of light incident at the angle on the interface of the pixilated apparatus is reflected when the first liquid crystal material is in the second state.

9. The device according to claim 8, wherein the pixilated electrodes are in-plane switching electrodes.

10. The apparatus according to claim 1, wherein the light is reflected via Fabry-Perot mechanism when the liquid crystal is in the second state.

11. The apparatus according to claim 1, wherein the light is reflected via total internal reflection mechanism when the liquid crystal is in the second state.

12. The apparatus according to claim 1, wherein the external field is a magnetic field.

* * * * *